United States Patent
Higbie et al.

(10) Patent No.: US 9,978,366 B2
(45) Date of Patent: May 22, 2018

(54) EVENT-BASED SPEECH INTERACTIVE MEDIA PLAYER

(71) Applicant: XAPPMEDIA, INC., Centreville, VA (US)

(72) Inventors: Patrick B. Higbie, Centreville, VA (US); John P. Kelvie, Washington, DC (US); Michael M. Myers, Washington, DC (US); Franklin D. Raines, Washington, DC (US)

(73) Assignee: XAPPMEDIA, INC., Centreville, VA (US)

( * ) Notice: Subject to any disclaimer, the term of this patent is extended or adjusted under 35 U.S.C. 154(b) by 0 days. days.

(21) Appl. No.: 14/880,084

(22) Filed: Oct. 9, 2015

(65) Prior Publication Data

US 2017/0103754 A1    Apr. 13, 2017

(51) Int. Cl.
 *G10L 15/00* (2013.01)
 *G10L 21/00* (2013.01)
 (Continued)

(52) U.S. Cl.
 CPC .............. *G10L 15/22* (2013.01); *G06F 3/165* (2013.01); *G10L 25/78* (2013.01)

(58) Field of Classification Search
 CPC ... G10L 15/22; G10L 15/26; G10L 2015/223; G10L 15/265; G10L 15/30; G10L 17/22;
 (Continued)

(56) References Cited

U.S. PATENT DOCUMENTS 4,525,793 A   6/1985   Stackhouse
5,301,227 A   4/1994   Kamei et al.
(Continued)

FOREIGN PATENT DOCUMENTS

CN   1666527   9/2005
CN   1805487   7/2006
(Continued)

OTHER PUBLICATIONS

European Search Report dated Nov. 24, 2016, directed to European Application No. 14792244.7; 9 pages.
(Continued)

*Primary Examiner* — Edgar Guerra-Erazo
(74) *Attorney, Agent, or Firm* — Morrison & Foerster LLP

(57) ABSTRACT

Interactive content containing audio or video may be provided in conjunction with non-interactive content containing audio or video to enhance user engagement and interest with the contents and to increase the effectiveness of the distributed information. Interactive content may be directly inserted into the existing, non-interactive content. Additionally or alternatively, interactive content may be streamed in parallel to the existing content, with only minimal modification to the existing content. For example, the server may monitor content from a content provider; detect an event (e.g., detecting a marker embedded in the content stream, or in a data source external to the content stream); upon detection of the event, play interactive content at one or more designated times while silencing the content stream of the content provider (e.g., by muting, pausing, playing silence.) The marker may be a sub-audible tone or metadata associated with the content stream. The user may respond to the interactive content by voice, touch or gesture.

41 Claims, 22 Drawing Sheets

(51) Int. Cl.
  *G10L 25/00* (2013.01)
  *G10L 15/22* (2006.01)
  *G10L 25/78* (2013.01)
  *G06F 3/16* (2006.01)

(58) Field of Classification Search
  CPC ....... G10L 15/00; G10L 25/78; G10L 19/018; G10L 2015/225; G06F 3/167
  USPC ..... 704/235, 246, 270, 270.1, 275, 277, 278
  See application file for complete search history.

(56) References Cited

U.S. PATENT DOCUMENTS

| | | | |
|---|---|---|---|
| 5,842,168 A | 11/1998 | Miyazawa et al. | |
| 6,516,349 B1 | 2/2003 | Lieberman | |
| 6,526,335 B1 | 2/2003 | Treyz et al. | |
| 6,708,176 B2 | 3/2004 | Strunk et al. | |
| 6,850,252 B1 | 2/2005 | Hoffberg | |
| 6,868,384 B2 | 3/2005 | Parus et al. | |
| 6,973,428 B2 | 12/2005 | Boguraev et al. | |
| 7,283,850 B2 | 10/2007 | Granovetter et al. | |
| 7,856,248 B1 | 12/2010 | Fujisaki | |
| 8,121,896 B1 | 2/2012 | Lagassey | |
| 8,234,119 B2 | 7/2012 | Dhawan et al. | |
| 8,428,944 B2 | 4/2013 | Poultney et al. | |
| 8,752,083 B2 | 6/2014 | Geer, III et al. | |
| 9,552,816 B2 * | 1/2017 | VanLund | G10L 17/22 |
| 2002/0038597 A1 * | 4/2002 | Huopaniemi | G06F 17/30743 84/609 |
| 2002/0083060 A1 * | 6/2002 | Wang | G06F 17/30743 |
| 2003/0014436 A1 * | 1/2003 | Spencer | G06Q 10/10 715/201 |
| 2003/0046244 A1 * | 3/2003 | Shear | G06Q 20/3674 705/52 |
| 2003/0125958 A1 | 7/2003 | Alpdemir et al. | |
| 2004/0024688 A1 * | 2/2004 | Bi | G06F 21/10 705/37 |
| 2004/0054923 A1 * | 3/2004 | Seago | H04L 63/102 726/4 |
| 2004/0260562 A1 | 12/2004 | Kujirai | |
| 2005/0203992 A1 * | 9/2005 | Tanaka | G06F 17/30026 709/203 |
| 2005/0227674 A1 * | 10/2005 | Kopra | H04M 1/72522 455/414.1 |
| 2006/0026629 A1 | 2/2006 | Harris et al. | |
| 2006/0041926 A1 * | 2/2006 | Istvan | H04N 5/4403 725/133 |
| 2006/0085521 A1 | 4/2006 | Sztybel | |
| 2006/0200348 A1 | 9/2006 | Knott et al. | |
| 2007/0113243 A1 | 5/2007 | Brey | |
| 2007/0124507 A1 * | 5/2007 | Gurram | G06F 3/0481 710/1 |
| 2007/0127640 A1 | 6/2007 | Brunel | |
| 2007/0220550 A1 | 9/2007 | Ljungman et al. | |
| 2007/0249330 A1 | 10/2007 | Cortegiano et al. | |
| 2008/0021790 A1 | 1/2008 | Brown et al. | |
| 2008/0119167 A1 | 5/2008 | Rao | |
| 2008/0130554 A1 | 6/2008 | Gisby et al. | |
| 2008/0147412 A1 | 6/2008 | Shaw et al. | |
| 2008/0152126 A1 | 6/2008 | Pitkamaki et al. | |
| 2008/0320512 A1 | 12/2008 | Knight | |
| 2009/0006191 A1 | 1/2009 | Arankalle et al. | |
| 2009/0076821 A1 * | 3/2009 | Brenner | G06F 17/30053 704/260 |
| 2009/0210795 A1 | 8/2009 | Katsuranis | |
| 2009/0222341 A1 | 9/2009 | Belwadi et al. | |
| 2009/0248419 A1 | 10/2009 | Spaulding et al. | |
| 2009/0320059 A1 | 12/2009 | Bolyukh | |
| 2010/0185512 A1 | 7/2010 | Borger et al. | |
| 2011/0078740 A1 | 3/2011 | Bolyukh et al. | |
| 2011/0093884 A1 | 4/2011 | Wachtfogel et al. | |
| 2011/0102161 A1 | 5/2011 | Heubel et al. | |
| 2011/0223893 A1 | 9/2011 | Lau et al. | |
| 2011/0231252 A1 | 9/2011 | Sattaru | |
| 2011/0288913 A1 | 11/2011 | Waylonis et al. | |
| 2012/0272262 A1 | 10/2012 | Alexander et al. | |
| 2013/0080194 A1 | 3/2013 | Im et al. | |
| 2013/0317823 A1 | 11/2013 | Mengibar | |
| 2014/0031960 A1 | 1/2014 | Hill | |
| 2014/0068648 A1 | 3/2014 | Green et al. | |
| 2014/0092007 A1 | 4/2014 | Kim et al. | |
| 2014/0207468 A1 | 7/2014 | Bartnik | |
| 2014/0330559 A1 * | 11/2014 | Higbie | G10L 15/26 704/235 |
| 2015/0113094 A1 | 4/2015 | Williams et al. | |
| 2015/0120295 A1 * | 4/2015 | Higbie | G10L 15/26 704/235 |
| 2016/0098998 A1 * | 4/2016 | Wang | G06F 17/30976 704/246 |
| 2016/0180853 A1 * | 6/2016 | VanLund | G10L 17/22 704/275 |

FOREIGN PATENT DOCUMENTS

| | | |
|---|---|---|
| CN | 101990678 | 3/2011 |
| EP | 2 200 021 | 6/2010 |
| WO | WO-00/22609 | 4/2000 |
| WO | WO-02/11120 | 2/2002 |

OTHER PUBLICATIONS

"Nuance Unveils Voice Ads: A Game Changer in Interactive Advertising," located at <<http://www.nuance.com/company/news-room/press-releases/voiceads.docx> visited on Aug. 14, 2013.

Honda. "Voice Command Index," located at <https://web.archive.org/web/*/http://techinfo.honda.com/rjanisis/pubs/OM/JA0606/JA0606N00137A.pdf> web archive from Sep. 5, 2012. (4 pages).

Higbie et al., U.S. Office Action dated Apr. 9, 2015, directed to U.S. Appl. No. 13/875,887; 23 pages.

Higbie et al., U.S. Office Action dated Nov. 17, 2015, directed to U.S. Appl. No. 13/875,887; 17 pages.

Higbie et al., U.S. Advisory Action dated Mar. 31, 2016, directed to U.S. Appl. No. 13/875,887; 3 pages.

Higbie et al., U.S. Office Action dated May 22, 2015, directed to U.S. Appl. No. 14/589,866; 17 pages.

Higbie et al., U.S. Office Action dated Nov. 27, 2015, directed to U.S. Appl. No. 14/589,866; 18 pages.

Higbie et al. U.S. Advisory Action dated May 12, 2016, directed to U.S. Appl. No. 14/589,866; 5 pages.

International Search Report and Written Opinion dated Sep. 25, 2014, directed to International Application No. PCT/US2014/036449; 17 pages.

International Search Report and Written Opinion dated Jan. 11, 2017, directed to International Application No. PCT/US2016/056134; 12 pages.

Higbie et al., U.S. Office Action dated Jun. 8, 2017, directed to U.S. Appl. No. 13/875,887; 17 pages.

Higbie et al. U.S. Office Action dated Jun. 30, 2017, directed to U.S. Appl. No. 14/589,866; 20 pages.

Notification of the first Office Action dated Feb. 2, 2018, directed to Chinese Application No. 201480033342.1, 20 pages.

* cited by examiner

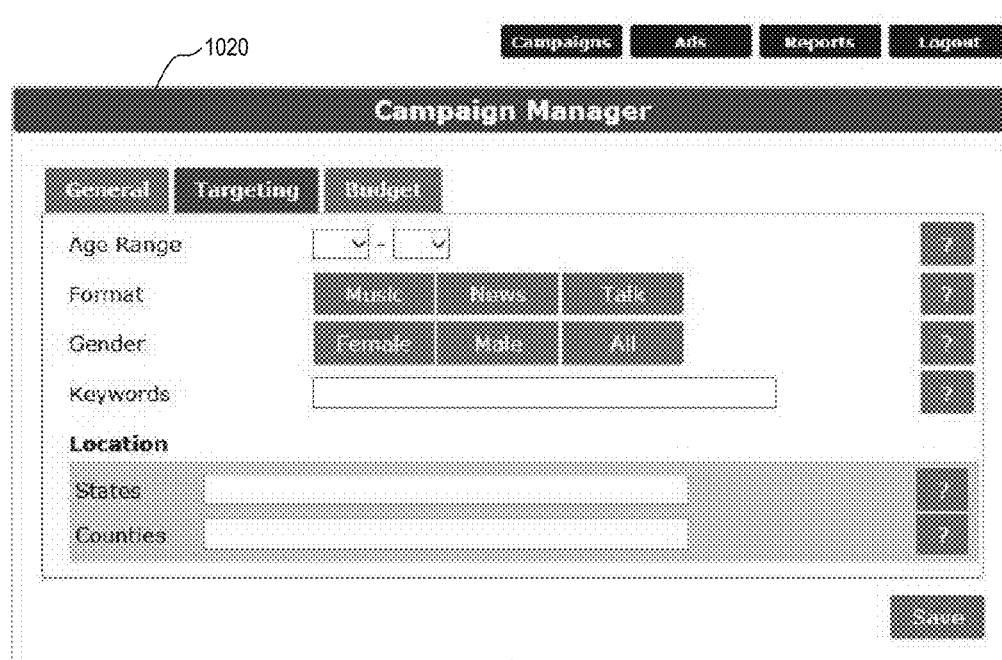
FIG. 10

EVENT-BASED SPEECH INTERACTIVE MEDIA PLAYER

RELATED APPLICATION

The present disclosure is related to techniques for providing interactive advertising content explained in U.S. patent application Ser. No. 13/875,887, now published as U.S. Patent Application Publication No. 2014/0330559, tilted "Device, System, Method and Computer-Readable Medium for Providing Interactive Advertising," filed on May 2, 2013, the entire content of which is hereby incorporated by reference.

FIELD

Described are devices, systems, methods, and computer-readable media for a technique for providing human interactive contents to users, particularly, digital media (e.g., audio and/or video) playing from streams and/or files that initiate voice-interactions based on one or more events.

BACKGROUND

Human-computer interactivity is one of most innovative and emerging technology areas that are constantly explored and developed these days. As computer utilization and dependency increase in human lives, there is an increasing need and incentive to make human-computer interactions easy, seamless, and efficient.

For example, people receive contents through various sources (e.g., streaming services, broadcasting services, selectable content providers, etc.) Conventional content (e.g., audio, video, and other forms of media) are distributed to users without the ability to allow users to respond or interact with the content being distributed. However, providing interactivity that allows users to control—for example, which content is to be streamed next, which other operation or function is to be activated in relation to the pushed contents, etc.,—can significantly increase user engagement with the content and make the user's experience with the content simpler, more enjoyable as well as more immersive.

SUMMARY

The present disclosure relates to a technique for providing human-interactive content, especially content that initiates speech interaction based on one or more events.

In some embodiments, a device receives streamed content, and in response to detection of one or more predefined events (e.g., detection of a sub-audible tone or similar marker, or metadata associated with the content, which can be embedded in the stream or sent separately from the associated content), the device activates a speech recognition mode (e.g., playback of speech interactive content, activating a speech recognizer, analyzing/processing a voice command, etc.). A sub-audible tone may be designed such that it is detectable by a device but not detectable by an unaided human ear.

Speech recognition used herein refers to the ability of a machine or program to identify words and phrases in spoken languages and convert them to a machine-readable format. Speech recognition is described herein with respect to the English language but is not limited to such language. The speech recognition may be implemented with respect to the Chinese language, Spanish language, etc.

In some embodiments, detection of predefined events include receipt of information dictating relevant timings associated with speech recognition (e.g., a time to start playing speech interactive content, a time to stop playing speech interactive content, a time to start playing silence, a time to turn on a speech recognizer, a time to stop the speech recognizer, a time to respond to a user's spoken command, etc.). This information may be contained in the form of metadata attached to the content (e.g., main content and/or interactive content) or streamed separate from the content. Alternatively or additionally, the information may be provided using network proxies such as sub-audible tones embedded in the content (e.g., main content and/or interactive content).

In some embodiments, a content provider (e.g., media publisher) provides main media content (e.g., audio and/or video data) to one or more playback devices of users (e.g., mobile phones, computers, tablets, vehicles, etc.). The media content (e.g., audio and/or video data) may be transmitted (and received by the users' devices) in such form ready to be played by a media playback mechanism of the user's devices.

It is to be noted that although reference is made to a data "stream" that delivers content from one point to another point (e.g., between publisher, interactive server, and/or users), streaming is not the exclusive delivery mechanism contemplated by this disclosure. The content may be transmitted in the form of one or more data files (e.g., to be downloaded and stored on local or remote storage devices). The content may be transmitted in various network types, e.g., Local Area Network (LAN), Wide Area Network (WAN), Wireless Local Area Network (WLAN), Metropolitan Area Network (MAN), Storage Area Network/Server Area Network (SAN), Campus Area Network/Cluster Area Network (CAN), Personal Area Network (PAN), etc.

In some embodiments, a device is provided with one or more processors and a memory storing one or more computer programs that include instructions, which when executed by the one or more processors, cause the device to perform: monitoring content data received from a remote content provider; detecting an event in the monitored content data received from the remote content provider, wherein the event comprises information identifying a start time for starting speech interactive content; in response to detecting the event: selecting a speech interactive content; playing the speech interactive content at the start time, and silencing the content data received from the remote provider (e.g., by muting, pausing, playing silence) while the speech interactive content is being played.

Optionally, detecting the event comprises detecting a sub-audible tone embedded in the content streamed from the remote content provider. The sub-audible tone (e.g., 20 Hertz or less) is not detectable by an unaided human ear but is detectable by the device. Alternatively or additionally, detecting the event comprises detecting instructions for starting speech interactive content in a metadata of the content stream streamed from the remote content provider.

In some embodiments, the one or more programs include instructions that when executed by the one or more processors, further cause the device to perform: detecting a second event identifying an end time for the speech interactive content; in response to detecting the second event identifying the end time for the speech interactive content, terminating the playback of the speech interactive content at the end time, and turning on a speech recognizer to start listening for a user's voice command for a predetermined period of time.

In some embodiments, the speech interactive content need not be terminated in order to start activation of the speech recognizer. Instead, the speech interactive content may be silenced while continuing to play in parallel while the speech recognizer is running. For example, the one or more programs include instructions that when executed by the one or more processors, further cause the device to perform: detecting a second event comprising information indicating a start time for activating a speech recognizer; in response to detecting the second event comprising information indicating the start time for activating the speech recognizer, beginning playback of a predetermined length of silent audio stream at the start time for activating the speech recognizer, and turning on the speech recognizer in parallel to start listening for a user's voice command for at least a predefined minimum period of time.

In some embodiments, the speech interactive content contains a period of silence embedded within itself for a duration that the speech recognizer is running. The duration that the speech recognizing is running is equal to or greater than the predefined minimum period of time. The predefined minimum period of time may be greater than 2 seconds, 3 seconds, 4 seconds, 5 seconds, etc. The predefined minimum period of time may be less than 30 seconds, 20 seconds, 10 seconds, etc.

In some embodiments, the speech interactive content is embedded within the stream, and an end of the speech interactive content is marked by an instruction to provide a prompt to a user (e.g., playing a predefined message, or dynamically created message, such as "to call, after the beep, say XXX", "to purchase, after the beep, say YYY," "to receive more information, after the beep, say ZZZ", etc.). For example, the device plays the prompt followed by the beep sound. After the beep, the speech recognizer SDK is activated to start listening to user's spoken commands (e.g., user speaking the action phrase taught in the prompt).

The action phrase (e.g., XXX, YYY, ZZZ) may be customized based on a number of pre-registered conditions, such as a content type, device type, user preferences, etc. The SDK is configured to detect and recognize the customized action phrases.

In some embodiments, instead of configuring the separate SDK for speech recognition, the existing speech recognition engine may be utilized, such as Siri on iOS, Amazon Echo, and speech interaction on Androids. In this way, the prompt may include an appropriate phrase that starts the associated speech recognition service. For example, "OK Google" is the phrase that starts the speech recognition on Androids, and similarly, "Hey Siri" on iOS and "Alexa" on Amazon Echo. Accordingly, the prompt may say "to call, after the beep, say Ok Google XXX," instead of just saying "to call, after the beep, say XXX." The user speaking "Ok Google XXX" initiates the speech recognition on Androids, which is then used to capture the command, XXX. Similarly, the prompt may say "to call, after the beep, say Hey Siri XXX," or "to call, after the beep, say Alexa XXX." This technique may result in a discontinuous and slower user experience but may still be advantageous, because its implementation does not need the separate speech recognizer SDK.

In some embodiments, a speech recognizer is always active. For example, it is running in the background, constantly listening for the wakeup word to be spoken (e.g., OK Google or Hey Siri). The wakeup word (prompt) then begins utilization of the speech recognizer. In other embodiments, a speech recognizer is turned off, and a wakeup word (prompt) first activates the speech recognizer and then starts utilization of the now-activated speech recognizer. In either case, a wakeup word (prompt) may be considered a sign to start using the speech recognizer.

After the prompt has been played, the speech recognition SDK is activated to listen to the user's spoken commands. The length of time the SDK remains activated varies depending on the design needs. For example, the SDK may remain activated for a fixed amount of time, a dynamically-determined amount of time (e.g., as long as some type of user speech activity is detected), or perpetually.

Further, in some embodiments, the SDK is activated during the playback of the interactive content such that the users can respond at any point during the playback of the interactive content. For example, the user is allowed to barge in during the playback of the interactive content to say a command. In this case, the prompt can be played at the beginning of the interactive content to inform the user what to say.

Upon detection of the user's spoken command, an action may be performed according to command-action correspondence data. If no user activity is detected (e.g., for a predetermined amount of time), the speech recognition can be automatically turned off, and the follow-up content is delivered.

In some examples, the delivery of the follow-up content does not need to be delayed until the speech recognition is turned off. Instead, the follow-up content may be delivered immediately after completion of the playback of the interactive content (or after a period of time has elapsed since the completion of the playback of the interactive content), regardless of the activation status of the speech recognition. For example, the follow-up content can be delivered while the speech recognition is still running so that the user can provide a barge-in command during playback of the follow-up content. Optionally, the timing at which the follow-up content is delivered depends on the user's response detected by the speech recognition (e.g., if user's speech activity is detected, the delivery of the follow-up content is delayed, etc.).

The follow-up content may comprise additional speech interactive media content, non-interactive media content, media content of a different source, etc. The follow-up content may be in at least an audio or video format. In some embodiments, the follow-up content may be selected based on the user's spoken command in relation to the previously played interactive content.

Accordingly, in embodiments of the interactive content system where the speech interactive content is included within the content streamed from the remote content provider and that stream contains the speech interactive content followed by a pre-determined period of silence, the one or more programs may include instructions that when executed by the one or more processors, further cause the device to perform the following: detecting a second event identifying an end time for the speech interactive content; in response to detecting the second event identifying the end time for the speech interactive content, and turning on a speech recognizer to start listening for a user's voice command for at least a predetermined minimum period of time. In this embodiment, the silence in the content stream continues to play while the speech recognizer is listening and while the user's voice command is being recognized.

Similarly, in embodiments where the speech interactive content is included within the content streamed from local storage and that stream contains the speech interactive content followed by a pre-determined period of silence, the one or more programs may include instructions that when executed by the one or more processors, further cause the device to perform the following: detecting a second event identifying an end time for the speech interactive content; in response to detecting the second event identifying the end time for the speech interactive content, and turning on a speech recognizer to start listening for a user's voice command for at least a predetermined minimum period of time. In this embodiment, the silence in the content stream continues to play while the speech recognizer is listening and while the user's voice command is being recognized.

The period of time for which the speech recognition is activated may be fixed or preset such that it is adjusted to the specific interactive content preceding the silence (e.g., a first value for first speech interactive content, a second value for second speech interactive content, etc.). Alternatively or additionally, the period of time for which the speech recognition is activated may be adjusted dynamically based on detection of speech activities (e.g., so that speech recognition is not stopped while user is speaking). Further, optionally, the period of time for which the speech recognition is activated may be adjusted based on conditions of the user's device (e.g., a first value if it is a mobile device, a second value if it is a vehicle audio/video system, etc.)

In some embodiments, the actual period of time for which the speech recognition is activated may be greater than 5 seconds, 10 seconds, 15 seconds, 20 seconds. The actual period of time for which the speech recognition is activated may be less than 2 minutes, 1 minute, 30 seconds, 20 seconds, 10 seconds, etc. After the period of time for which the speech recognition is activated has elapsed, the speech recognizer is turned off, and the content is resumed. This involves stop playback of the silence that was played while the speech recognizer was activated.

In some embodiments, the one or more programs include instructions, which when executed by the one or more processors, further cause the device to perform the following: while the speech recognizer is turned on: receiving a voice command from the user; in response to receiving the voice command, initiating a response associated with the received voice command, wherein the associated response includes at least one of: playing second speech interactive content different from the speech interactive content, activating a CALL application, activating an EMAIL application, and activating a web application.

In some embodiments, after receiving a voice command from a user, the device sends the voice command (e.g., in audio format or text format after conversion) to a remote device (e.g., a remote content provider) for analysis in connection with the speech interactive content. After analysis, the remote server transmits to the playback device appropriate instructions on how to respond to the user's voice command (e.g., opening a certain application, etc.)

In some embodiments, the voice command received from the user is analyzed locally on the device based on the command-action information transmitted from the remote content provider along with the speech interactive content.

The one or more programs may further include instructions, which when executed by the one or more processors, cause the device to perform the following: detecting completion of execution of the action responding to the user's voice command; in response to detecting completion of execution of the action responding to the user's voice command, un-silencing the content data received from the remote content provider (e.g., by unmuting, resuming, playing non-silence content).

In some embodiments, the main media content contains speech interactive content are part of a single stream of content, where the speech interactive content includes a period of silence for the period of speech recognition (e.g., when a speech recognizer is turned on.) In this way, the speech interactive content need not be silenced in order to initiate the speech recognition and thus need not be un-silenced. Alternatively or additionally, the main media content is streamed separately from the speech interactive content. The speech interactive content may not include a dedicated period of silence for the speech recognition. Then, the main media content need to be silenced (e.g., stopped, muted, playing silence in lieu of content) in order to play the speech interactive content. Also, to activate speech recognition, the speech interactive content need to be silenced (e.g., stopped, muted, playing silence). After the end of the speech recognition, the speech interactive content may be un-silenced, and after the end of the speech interaction, the main media content may be un-silenced.

In some embodiments, a method for providing speech interactive content is provided. The method comprises: monitoring content data received from a remote content provider; detecting an event in the monitored content data received from the remote content provider, wherein the event comprises information identifying a start time for starting speech interactive content; in response to detecting the event: selecting a speech interactive content; playing the speech interactive content at the start time, and silencing the content data received from the remote provider (e.g., by muting, pausing, playing silence) while the speech interactive content is being played.

In some embodiments, a non-transitory computer readable medium comprising one or more computer programs is provided. The computer programs, when executed by a device with one or more processors, cause the device to perform the following: monitoring content data received from a remote content provider; detecting an event in the monitored content data received from the remote content provider, wherein the event comprises information identifying a start time for starting speech interactive content; in response to detecting the event: selecting a speech interactive content; playing the speech interactive content at the start time, and silencing the content data received from the remote provider (e.g., by muting, pausing, playing silence) while the speech interactive content is being played.

In some embodiments, detecting the event comprises detecting a sub-audible tone embedded in the content streamed from the remote content provider. The sub-audible tone (e.g., 20 Hertz or less) is not detectable by an unaided human ear but is detectable by the device. Alternatively or additionally, detecting the event comprises detecting instructions for starting speech interactive content in a metadata of the content stream streamed from the remote content provider.

BRIEF DESCRIPTION OF THE DRAWINGS

The characteristics and advantages of the devices, systems, methods, and computer-readable media for providing interactive streaming content will be explained with reference to the following description of embodiments thereof, given by way of indicative and non-limiting examples with reference to the annexed drawings, in which:

FIG. 10 illustrates an example of a screenshot of a campaign manager application, in accordance with some embodiments described herein.

DETAILED DESCRIPTION OF THE INVENTION

Figure 1:
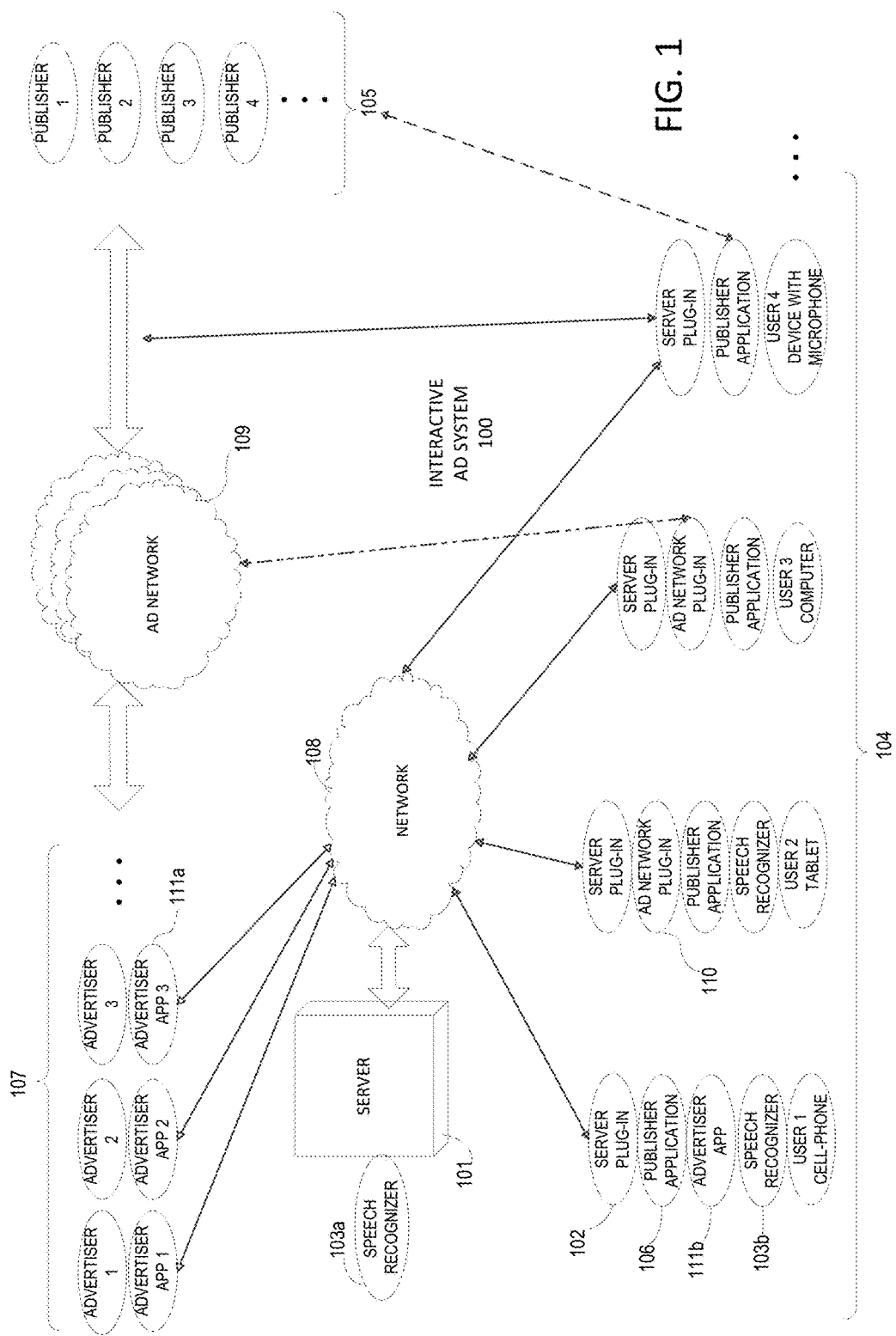
FIG. 1 illustrates an example of a system that allows interactive advertising via a server, in accordance with some embodiments described herein.

The present disclosure relates to a technique for providing interactive content in the middle of, or in conjunction with, streaming content. One way to provide interactive content in the middle of, or in conjunction with, the streaming content is to modify the streaming content such that the interactive content is directly embedded (e.g., inserted) into the streaming content (e.g., a direction insertion technique). An example of this technique is described in reference to at least FIGS. 11A-11B.

Another way to provide interactive content in the middle of, or in conjunction with, the streaming content is to silence the streaming content at a desired time and play interactive content in place of the silenced streaming content (e.g., a multi-stream technique.) An example of this technique is described in reference to at least FIGS. 12A-12B. For example, in this approach, switching from a stream of non-interactive content to a stream of interactive content can be triggered upon detection of one or more predefined events (e.g., recognition of a marker, metadata analysis, etc.) Further, the events can be used to notify when to start playing the interactive content in place of the non-interactive content, when to start speech recognition, whether to resume the non-interactive content at the end of the interactive content or activate a different operation based on a voice command, etc.

A direct insertion technique is beneficial at least in a way that a single stream of content that includes both non-interactive portion and interactive portion is played to the users. Since one continuous stream is played from a single source, switching from non-interactive portion to interactive portion is smooth.

A multi-stream technique is beneficial in that it does not require direct and significant modifications to the original content, yet it can be distributed with interactivity. However, a precise timing control is desired to achieve a smooth switching between a stream of non-interactive content from a first source and another stream of interactive content from a second source.

Interactive content is, optionally, audio-only, audio and video, or video-only content. Interactive content may be configured to interact and respond to user's voice commands or other types of commands such as commands via touch inputs, motion inputs, or inputs provided by other mechanical input mechanisms (e.g., keyboards, joystick, button, knob, stylus, etc.)

Interactive content as described in this disclosure is, optionally, interactive advertising content or non-advertising content such as streaming songs, news, or other entertaining or informative media, etc. Interactive advertising content is used interchangeably with interactive content, such that the descriptions of the interactive advertising content are not limited to the interactive advertisements but may also be applied to non-advertising interactive content. Conversely, the descriptions of the interactive content can be equally applied to the advertising content and non-advertising content so long as those contents are human interactive as described and contemplated by the present disclosure.

Various characteristics and methodologies of making content interactive to human inputs, especially voice inputs, are described in U.S. patent application Ser. No. 13/875,887, titled "Device, System, Method, And Computer-Readable Medium For Providing Interactive Advertising," filed on May 2, 2013, the content of which is incorporated herein by reference in its entirety. The descriptions in the identified application are provided in reference to one exemplary form of interactive content, interactive advertising content. However, it is to be noted that those descriptions and teachings can equally be applied to non-advertising content that is made human interactive, specifically speech interactive.

Note that the techniques are described in reference to exemplary embodiments, and any other modifications may be made to the described embodiments to implement the interactive streaming content technology and are deemed within the scope of the present disclosure. Further, the described examples may be embodied in many different forms and should not be construed as limited to the embodiments set forth herein; rather, these embodiments are provided so that this disclosure will be thorough and complete, and will fully convey the scope of the claims to those skilled in the art.

Like numbers refer to like elements throughout. As used herein, the term "and/or" includes any and all combinations of one or more of the associated listed items. It will be understood that, although the terms first, second, etc. may be used herein to describe various elements, these elements should not be limited by these terms. These terms are only used to distinguish one element from another element. Thus, a first element discussed below could be termed a second element without departing from the scope of the claimed subject matter.

The terminology used herein is for the purpose of describing particular embodiments only and is not intended to limit the claims. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having meanings that are consistent with their meanings in the context of the relevant art and will not be interpreted in an idealized or overly formal sense unless expressly so defined herein.

As will be appreciated by one of skill in the art, the claimed subject matter may be embodied as a method, device, data processing system, or computer program product. Furthermore, the claimed subject matter may take the form of a computer program product on a computer-usable storage medium having computer-usable program code embodied in the medium. Any suitable computer-readable medium may be utilized including hard disks, optical storage devices, a transmission media such as those supporting the Internet or an intranet, or magnetic storage devices.

Computer program code for carrying out operations of the embodiments of the claimed subject matter may be written in an object-oriented programming language. However, the computer program code for carrying out operations of the embodiments of the claimed subject matter may also be written in conventional procedural programming languages, such as the "C" programming language.

In some embodiments, the program code may execute entirely on a single device (e.g., a playback device, a remote content server), partly on the single device, as a stand-alone software package, partly on a first device (e.g., a playback device) and partly on a second device (e.g., a remote computer) distinct from the first device, or entirely by a remote computer. In the latter scenario, the remote computer may be connected to the computer through a local area network (LAN) or a wide area network (WAN), or the connection may be made to an external computer (for example, through the Internet using an Internet Service Provider). For example, the playback devices may be a TV, a computer, a computer-embedded automobile audio system, a tablet, a smartphone, and other smart devices.

The claimed subject matter is described in part below with reference to flow chart illustrations and/or block diagrams of methods, apparatus (systems), and computer program products according to embodiments of the claimed subject matter. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flow chart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flow chart and/or block diagram block or blocks.

Characteristics of Interactive Content

Exemplary characteristics of interactive content are explained in reference to interactive advertising content. As noted previously, the descriptions and teachings herein are not limited to the advertising content and can equally be applied to non-advertising interactive content (e.g., a stream of songs, videos, news, other entertaining or informative media, etc.) By way of example, an audio stream of song contents can be made speech interactive, such that a user speaks a voice command while the song contents are streamed, to request that a different content stream (e.g., different genre of songs or different media content) be streamed onto the user's device. By way of another example, an audio stream of news can be made interactive such that a user speaks a voice command while the news is streamed, to request that an automatic keyword search be performed in a preferred search engine, and/or open a web browser containing more in-depth information concerning the news streamed at the time of receiving the voice command. Various other modifications and permutations are possible in the applications of the interactive content as will be apparent to those skilled in the art, and all of such variations are deemed within the scope of the present disclosure.

FIG. 1 schematically shows an example of a system that allows interactive advertising via a server, in accordance with some embodiments described herein. System 100 includes a server 101, one or more advertisers 107, one or more publishers 105, and one or more users 104.

The publisher 105 may broadcast and/or stream content to users through various communication media (e.g., radio and/or tv communication media, Internet podcast media, or any equivalent thereof). The content usually includes audio data with or without the corresponding visual data. The user 104 is equipped with a device that may receive the content transmitted from the publisher.

The device has an input unit, for example, a microphone for receiving audio inputs. The microphone may be embedded in the device or externally connected to the device. There may be further input units for receiving various other forms of input data (e.g., text or selection from the list), including, but not limited to, a keyboard, a keypad, a joystick, a roller, a touch pad, a touch screen, or any equivalent thereof. In FIG. 1, the devices operated by the users may include a cellphone, a tablet, a computer, and a device with a connected microphone. Other examples of a user device may include, but not limited to, cars, TVs, stereo systems, etc.

Advertisers 107 are those that provide advertising content to publishers. In the system, the advertisers provide their advertising content to server 101 along with other target criteria information, and then the server 101 selects the appropriate content for each individual user 104 and transmits it to the corresponding user 104. Then, the user 104 that receives the content may interact with the advertiser 107, other content stored in the server, or any equivalent thereof, in real-time through server 101.

The multi-path communication through server 101 may be accomplished by using plug-in computer programs. A plug-in is a set of software components that provide specific abilities to a larger software application, and may enable customizing the functionality of an application. A plug-in computer program may be stored in and executed by a processor of the server 101, a device for the user 104, and/or a device for the publisher 105, to customize the functionality of the respective devices in the interactive advertising system 100.

For example, a server plug-in 102 may be stored in and executed by a processor of the device for user 104 such that the server plug-in 102 helps the user 104 to interact with the corresponding publisher 105 (e.g., through publisher's application), the server 101 through the network 108 (e.g., HTTP web-based Internet, any proprietary network, or any equivalent thereof capable of two-way communications) and/or the corresponding advertiser 107 through the server 101. The advertisers and users may use the same network to communicate with the server, or may use different networks to communicate with the server.

Similarly, a server plug-in 102 may be stored in and executed by a processor of the publisher 105 and/or of the advertiser 107 to customize the functionality of the publisher 105 and/or the advertiser 107 in the interactive advertising system 100, if necessary or beneficial.

In addition, a publisher application 106 may also be stored in and executed by the user's device to receive the content from the corresponding publisher. A server plug-in 102 may make the publisher application 106 and the interactive advertising system 100 compatible with the conventional broadcasting of the content from the publisher. The publisher application 106 may communicate and interact with the server 101 through a customized plug-in 102.

Each advertiser and/or user may run a separate advertiser application and/or a separate customized plug-in, or a plurality of advertisers and/or users may run a shared publication application through the network. In the exemplary system shown in FIG. 1, each advertiser 1-3 runs a separate advertiser application 111a that is configured to communicate with the server 101 and one or more users 104 through the network 108. The one or more users 104 may have installed on their devices a corresponding advertising application 111b.

The advertiser applications 111a/111b may provide significant extensibility to the capabilities of the overall interactive advertising system, for example, because they may be called and/or launched by users' commands or speaking of appropriate action phrases, including, but not limited to, "call now," "buy it," "go to," or any other phrases that may be additionally or alternatively implemented in the system.

When the advertiser applications 111a/111b are called or launched, they may provide a wide range of functionalities customized to the corresponding advertiser, including, but not limited to: mobile interactive voice response (IVR), call routing, voice or touch mobile purchases, voice or touch order fulfillment, voice or touch customer feedback, voice or touch customer service, voice web-site access, etc.

Advertisers 107 may provide advertising content to users through ad network(s) 109. Ad network plug-in(s) 110 may be embedded in the corresponding publisher application 106 to provide the content to the users. Then, the server plug-in 102 that is configured to communicate with the server 101 through the network 108 may be embedded in the ad network plug-in 110 such that the user may interact with the advertising content provided by the advertiser 107 through ad network(s) 109.

Users 104 may interact with the advertising content as they receive it from the publishers 105 by inputting commands (e.g., audio command, text command, selection command, or any equivalent thereof) using the input unit(s) of the device. In particular, the description herein may emphasize the user's interaction by audio commands, but a similar concept may apply to other schemes without departing from the core idea and spirit of the claims.

As the user 104 receives the advertising content from the publisher 105, the user may input an audio command, for example, requesting more information about the item, requesting to purchase the item, or requesting to provide feedback to the advertiser, etc.

Figure 9:
FIG. 9 illustrates an example of a screenshot of an ad manager application, in accordance with some embodiments described herein.

These requests are provided herein only as examples, and more commands may be made available through a simple modification to the system as will be apparent to one of ordinary skill in the art. In particular, the command list may be dynamically defined, and the command definitions may leverage native capabilities on the corresponding device, such as, non-exclusively, dialing a number, initiating a SKYPE session, opening a web page, downloading and/or installing an application, playing an audio file, etc. In fact, the interactive advertising platform (system) may allow users, advertisers, publishers, or any relevant entities in the interactive advertising market to dynamically define the commands to take advantage of any native device capabilities with use of a simple application such as, non-exclusively, an advertiser mini-application, an ad manager web-page/application, etc. An exemplary screenshot of an ad manager application is shown in FIG. 9.

Additionally or alternatively, the platform may also allow advertisers, publishers, and/or any relevant entities in the interactive advertising market to hook in their own server-side logic via the network (e.g., web service notifications) to customize the interactive advertising system according to their specific needs.

The user's audio command is then recognized by a speech recognizer (VR), which may be implemented on the user's device as shown in the speech recognizer 103b in FIG. 1, or may be implemented on the server's side as shown in the speech recognizer 103a in FIG. 1. The speech recognizer 103a/103b may process the user's audio. Optionally, it may also return the corresponding text version to the user. Further, the server plug-in 102 then may process the recognized user's response—for example, if the user's recognized response calls for a 'call-now' action, the server plug-in 102 may get the corresponding advertiser's phone number from the server 101 and cause the user's device to initiate automatic calling of the advertiser's number.

In another example, the user's recognized response may call for providing feedback to the advertiser 107, in which case the server plug-in 102 resets the VR 103a/103b to listen to the user's feedback, the VR 103a/103b processes the user's feedback and returns the feedback to the server 101, and then the server 101 may send the feedback to the corresponding advertiser 107, or otherwise make it available for access by the corresponding advertiser 107. Further actions and commands will be described below with reference to other figures.

The publisher application 106 may be installed on the user's device or any device with a processor capable of executing the publisher application 106, and may be used to broadcast and/or stream the content provided by the corresponding publisher 105 on the user's device 104. In FIG. 1, the users 1-4 each run a publisher application on their corresponding devices, i.e., a cell-phone, a tablet, a computer, and a device with microphone. As previously noted, the user devices may also include cars, TVs, stereo systems, or any equivalent device with audio functionalities.

The server plug-in 102 may be installed on the user's device or any device with a processor capable of executing the server plug-in 102, and may be used to communicate with the server 101. The server plug-in 102 may or may not provide the speech recognizer to the user device on which it is installed. If it does not provide the speech recognizer to the user device, the speech recognizer on the server's end, 103a, may instead be used. Further, the server plug-in 102 may be embedded directly in the publisher application 106, in which case the advertisers 107 are connected to the publishers 105 and ultimately to users 104 through the network 108, and/or embedded in the ad network plug-in 110, in which case the advertisers 107 are connected to the publishers 105 and ultimately to users 104 through either or both the ad network 109 and the network 108.

For example, for user 1 in FIG. 1, the server plug-in 102 is embedded in the publisher application 106, and provides the speech recognizer 103b to the user device. For user 2, the server plug-in 102 is embedded in the ad network plug-in 110, which is then embedded in the publisher application 106, and also provides the speech recognizer 103b to the user device. For user 3, the server plug-in 102 is embedded in the ad network plug-in 110, which is then embedded in the publisher application 106, but does not provide the speech recognizer to the user device. For user 4, the server plug-in 102 is embedded in the publisher application 106 that does not run an ad network plug-in, and does not provide the speech recognizer to the user device.

Accordingly, the server plug-in 102 operating on the user devices 2 and 3 with the ad network plug-in 110 may receive advertising content and otherwise communicate and/or interact with the advertisers 107 through either or both the ad network 109 and the network 108 that includes the server 101. Further, the server plug-in 102 operating on the user devices 3 and 4 may recognize the user's spoken response through the speech recognizer 103a implemented on the server 101.

Once the speech recognizer 103a/103b processes the recognition of the user's audio command, then the server 101 may operate in an interactive manner in response to the recognized command, including, for example, initiating an action in response to an action by another component. Examples of the processing flow in each of these components will be described below, but any obvious modification to these examples may be made to satisfy any specific technical and design needs of an interactive advertising system as will be apparent to one of ordinary skill in the art.

Further, the publisher application 106, plug-in 102 and/or voice-recognizer (VR) 103 may be customized or modified, separately or in combination, depending on each user 104 (e.g., specific characteristics of the user's device). For example, different techniques may be configured to recognize the user's spoken response and/or audio command based on the microphone configuration in use (e.g., headset, Bluetooth, external, etc.).

Figure 2:
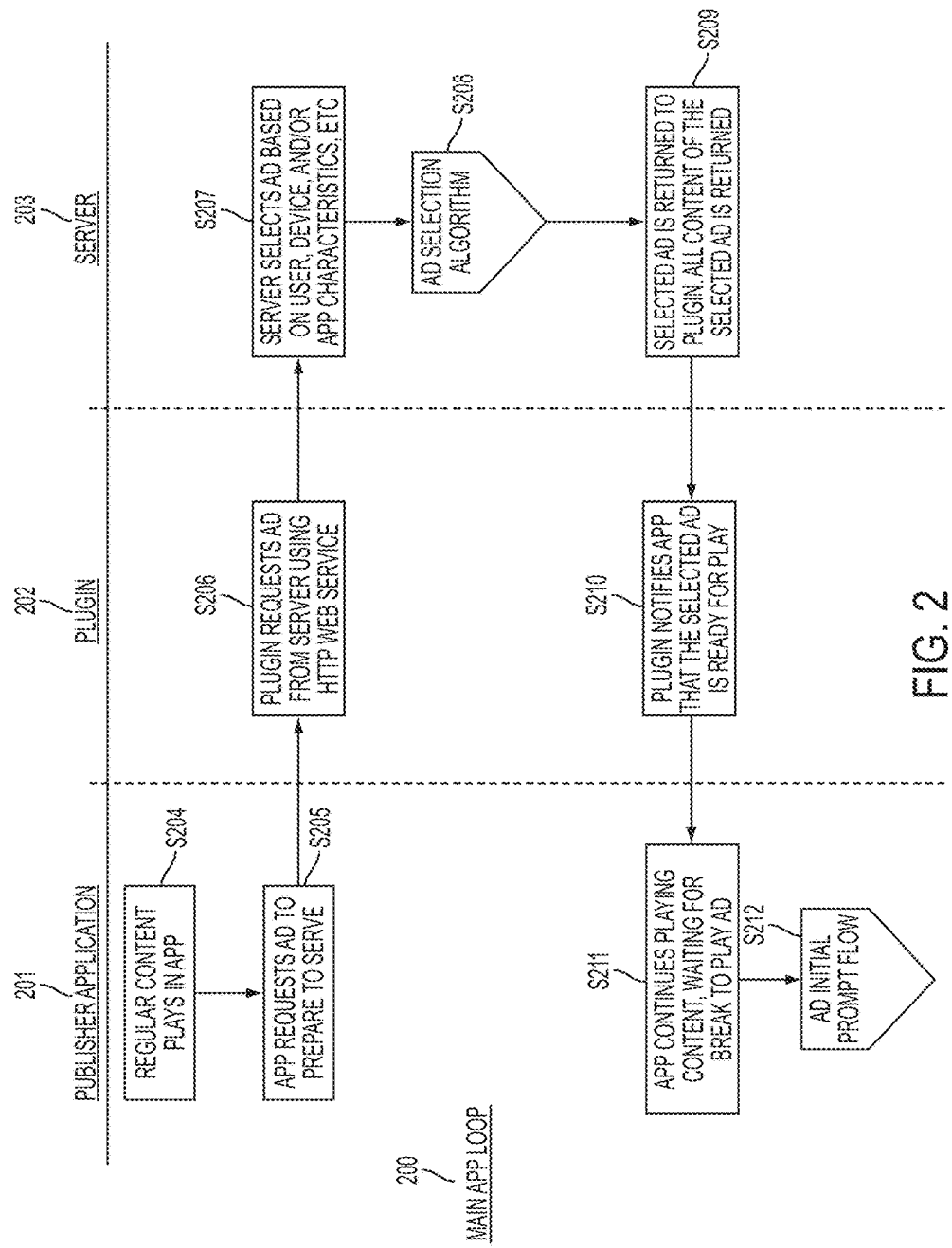
FIG. 2 illustrates an example of a main loop processing flow chart that may apply to the interactive advertising system 100 shown in FIG. 1, in accordance with some embodiments described herein.

FIG. 2 shows an example of a main loop processing flow chart that may apply to the interactive advertising system 100 shown in FIG. 1, in accordance with some embodiments described herein. A publisher application 201 may be used to implement the publisher application 106 in the interactive advertising system 100 shown in FIG. 1.

A plug-in 202 may be used to implement the customized plug-in 102 in the interactive advertising system 100 shown in FIG. 1. A server 203 may be used to implement the server 101 in the interactive advertising system 100 shown in FIG. 1.

In the exemplary main loop processing flow 200 shown in FIG. 2, the publisher application 201 initially plays the regular content, represented in step S204. The regular content may include any broadcasted and/or streamed content, including, but not limited to, radio content, IP radio content, tv content, etc. At S205, before reaching the predetermined break time for advertisements, the publisher application 201 requests advertising content to prepare to serve to the user(s). The content-request may be automatically generated by the publisher's application and not generated or prompted by the user.

Additionally or alternatively, the publisher's application may generate a content-request for a certain type of advertising content based on one or more user actions or characteristics (e.g., a certain action by user, or certain characteristics of the pre-stored settings in the user's device, may trigger the plug-in in the user's device to select sports-related content over food-related content, etc.). Examples of such user actions or characteristics may include, but not limited to, a spoken or written command, a prompt by clicking a button, a record of frequently visited web-pages stored in the device, a record of previously played advertising contents that were acted upon by the user, etc.

At S206, the request from the publisher application 201 is transmitted to the server 203 by the plug-in 202 using the HTTP web service. At S207, upon receiving the advertising-content request, the server 203 selects an appropriate advertising content for that particular request. The selection may be made based on various characteristics, including, but not limited to, the characteristics of the recipient-user of the content from the requestor-publisher application, the associated user device, and/or the publisher application, the time, the weather of the day, or the area associated with the user device, etc.

The advertising-content selection may be implemented using one or more computer program algorithms, for example, by giving different cut-offs for each characteristic, putting different weight on each characteristic, or any other ways to filter and select the target advertisement for the user as will be apparent to one of ordinary skill in the art. Further, the server 203 may be configured to apply different algorithms based on a certain characteristics of the user, user-device, publisher application, and/or the advertiser. An algorithm may be pre-defined, or may be customizable for each advertiser such that the advertiser can select a target audience and decide how the server can select the target audience. An example of the ad selection algorithm that may be used in S208 is explained below with reference to FIG. 6.

At S209, the selected advertising content is transmitted from the server to the plug-in 202. The content of the selected advertisement as previously provided from the advertiser and stored in the server is transmitted. At S210, the plug-in 202, after receiving the selected advertising content from the server 203, notifies the publisher application 201 that the advertisement is ready for play.

At S211, after receiving the ready-sign from the plug-in 202, the publisher application 201 continues the playing of the regular content while waiting for an advertisement break, and plays the advertising content received from the server 203 during the advertisement break. At S212, as the advertisement break starts, and consequently, the selected advertising content is ready to be played, a different processing flow (e.g., ad initial prompt processing flow) starts to run on the associated components. An example of such an ad initial prompt processing flow is shown in FIG. 3.

Figure 3:
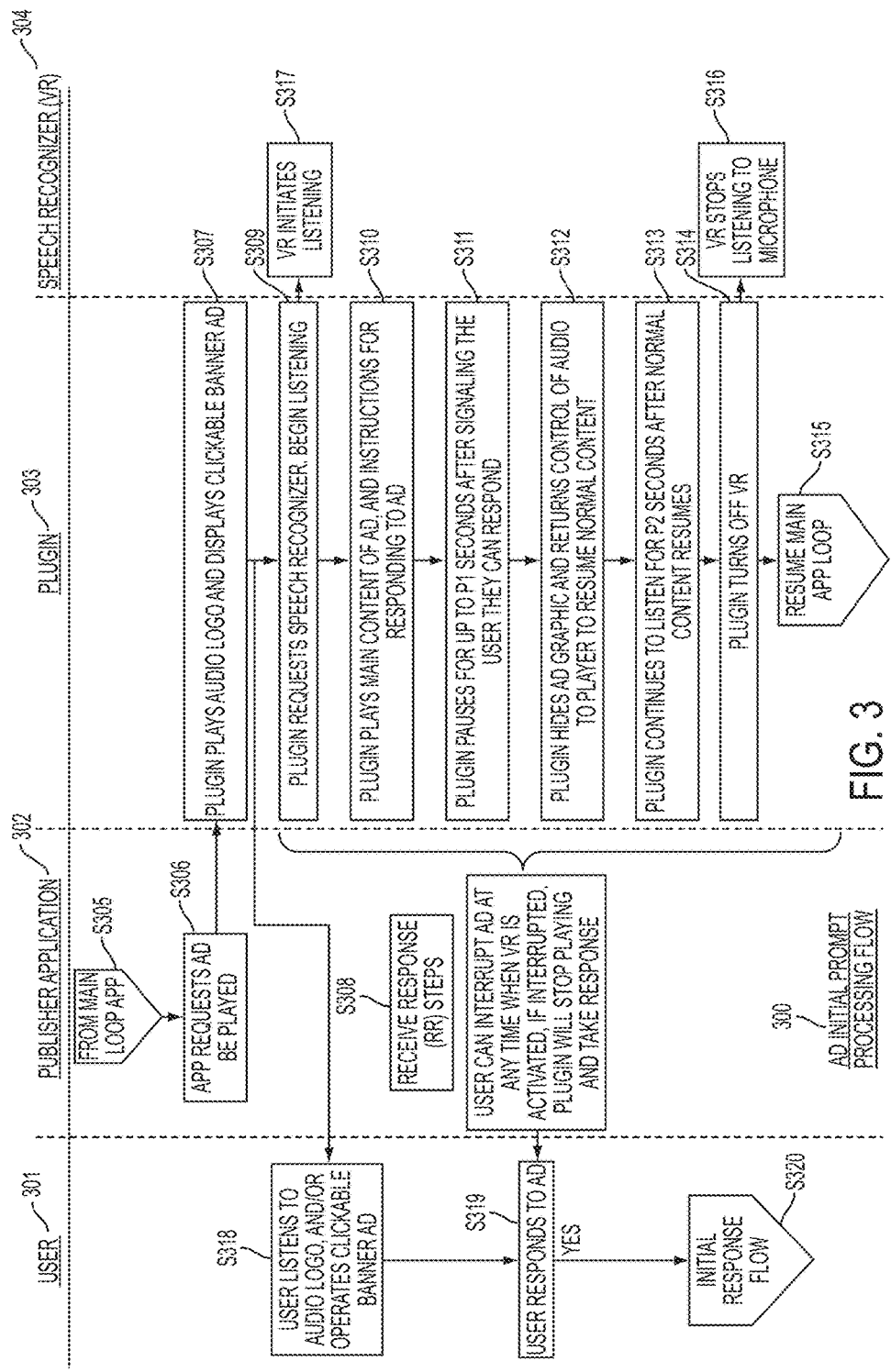
FIG. 3 illustrates an example of an ad initial prompt processing flow chart that may apply to step S212 in FIG. 2, in accordance with some embodiments described herein.

FIG. 3 schematically shows an example of an ad initial prompt processing flow chart that may apply to step S212 in FIG. 2, in accordance with some embodiments described herein. User 301 may correspond to the user 104 in the interactive advertising system 100 shown in FIG. 1.

The publisher application 302 may be used to implement the publisher application 106 in the interactive advertising system 100 shown in FIG. 1. The plug-in 303 may be used to implement the plug-in 102 in the interactive advertising system 100 shown in FIG. 1. The speech recognizer (VR) 304 may be used to implement the VR 103 in the interactive advertising system 100 shown in FIG. 1. Further, if the processing flow of FIG. 3 applies to step S212 in FIG. 2, the publisher application 302 may correspond to the publisher application 201 in FIG. 2, and the plug-in 303 may correspond to the plug-in 202 in FIG. 2.

The ad initial prompt processing flow 300 may be executed during an advertisement break time in the regular content broadcasted from the publisher and received by the user's device through the publisher application 302. At S305, the system transitions from the main loop processing flow 200 to the ad initial prompt processing flow 300 as the advertisement break time starts. As previously noted with reference to FIG. 2, before the advertisement break time starts, the plug-in already completes the requesting and receiving of the advertisement selected and transmitted by the server as well as its corresponding advertising content. This advertising content may be locally stored to be ready for service or play.

At S306 and S307, when the publisher application 302 sends a cue sign, i.e., requests the on-hold selected advertising content to be played, the plug-in 303 plays the advertising content. If the content includes both audio and visual data, the plug-in 303 plays both the audio and visual data on the user's device.

Further, the plug-in 303 may cause the user's device to display clickable banner ads corresponding to the content being played. Accordingly, the user may listen and/or see the advertising content.

At S309, as soon as the advertising content starts being played, the plug-in 303 also sets the speech recognizer (VR) 304 to a ready-state. The VR 304 is switched to an on state, ready to listen to the user's audio command, as represented in step S317. Further, as soon as the VR 304 is activated, the user can interrupt the advertising content being played at any time and input an audio command. For example, if the user makes a noise with sufficient decibels to be recognized as an audio input, the plug-in 303 will stop playing the advertising content, and then the VR 304 will take the user's audio command and process it. This is represented as the 'receive response' step(s) at S308.

At S310, the plug-in 303 plays the main content of the advertisement and subsequently plays the pre-recorded instructions for users on how to respond to the advertisement. At S311, after the instructions have been played, the plug-in 303 plays a signal to the user and pauses for up to a predetermined number of seconds, e.g., P1 seconds, after the signal. P1 may be any value near three (3), including, but not limited to, 1, 1.5, 2, 2.5, 3.5, 4, 4.5, or any other non-negative value. At S312, after the P1 seconds, the plug-in 303 removes or hides the visual/graphic data of the advertising content (e.g., the graphic banner advertisement) and returns control of the audio to the device/player so that the regular content (e.g., from the publisher application) is resumed.

At S313, even after the regular content is resumed, the plug-in 303 can still receive the user's audio commands for up to a predetermined number of seconds, e.g., P2 seconds. P2 may be any value near five (5), including, but not limited to, 2, 2.5, 3, 3.5, 4, 4.5, 5.5, 6, 6.5, 7, 7.5, or any other non-negative value. These predetermined parameters P1 and P2 may each have a default value but may also be modified by the user, user's device, plug-in, publisher application, server, and/or the creator of the advertising content such as the advertiser.

At S314, after P2 seconds, the plug-in 303 turns off the speech recognizer (VR) 304, and then the VR 304 stops listening to the microphone of the user's device, as represented in step S316. Then, at S315, after the plug-in 303 has turned off the VR, the main loop processing flow may resume.

Further, immediately after the step S307 when the plug-in 303 starts playing the audio portion of the advertising content as well as displaying the visual portion of the advertising content on the user's device, the user may make a response at any time by inputting either or both of the audio command, text command, selection command, or any equivalent thereof, as represented in step S318 in FIG. 3.

At S319, if the user inputs a response to the advertising content, an initial response processing flow starts, as represented in step S320. The user may input a response at times defined in steps S308-S314. If the user does not input any response, the main app loop may resume, as represented in step S315.

Figure 4:
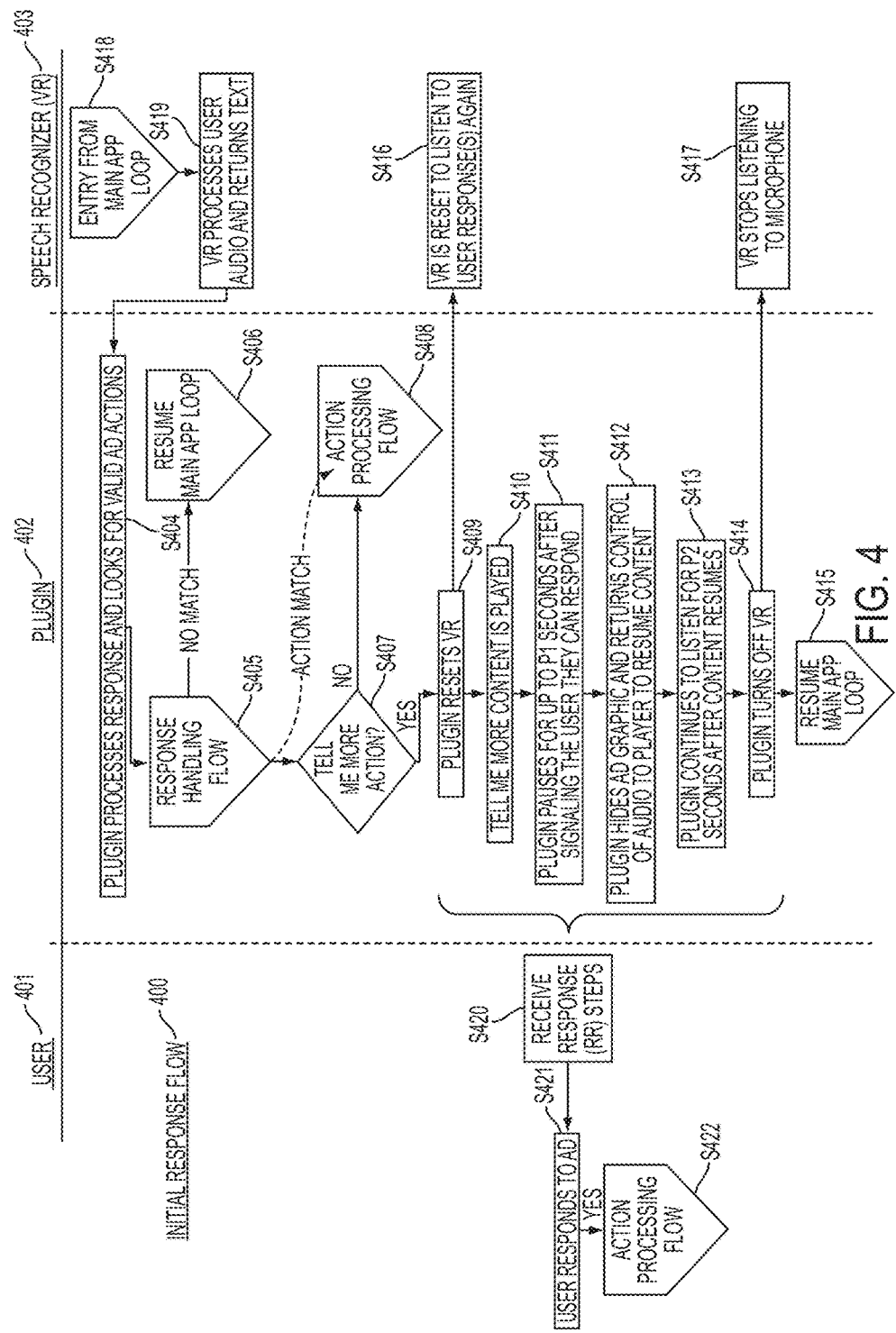
FIG. 4 illustrates an example of an initial response processing flow chart that may apply to step S320 in FIG. 3, in accordance with some embodiments described herein.

FIG. 4 schematically shows an example of an initial response processing flow chart that may apply to step S320 in FIG. 3, in accordance with some embodiments described herein. In previous steps, the speech recognizer (VR) has received the user's audio command. FIG. 4 shows an exemplary processing flow chart for processing such a response inputted by the user and recognized by the VR. The processing of the response may be done by the VR and/or the plug-in.

In the example shown in FIG. 4, user 401 may correspond to the user 104 in the interactive advertising system 100 in FIG. 1, plug-in 402 in FIG. 4 may correspond to the plug-in 103 in FIG. 1, and voice-recognizer (VR) 403 in FIG. 4 may correspond to the speech recognizer (VR) 103 in FIG. 1.

Further, the initial response processing flow 400 shown in FIG. 4 may apply to step S320 in FIG. 3 in which case the user 401 in FIG. 4 may correspond to the user 301 in FIG. 3, the plug-in 402 in FIG. 4 may correspond to the plug-in 303 in FIG. 3, and the VR 403 in FIG. 4 may correspond to the VR 304 in FIG. 3.

The initial response processing flow chart shown in FIG. 4 starts with step S418 representing a transition from the main app loop to a state where the user inputs a command which is recognized by the device. Specifically, at S419, the VR 403 recognizes the user's audio input command, processes it, and may return a corresponding text command to the user for, for example, confirmation. Also, the VR 403 transmits the command to the plug-in 402 for further processing, as shown in step S404.

At S404, the plug-in 402 processes the response (e.g., the response recognized by the VR 403 if the response was audio command inputted by microphone, or the response inputted by other input units such as touch pad, keyboard, etc.) and searches for a valid advertisement action (hereinafter, "ad action") corresponding to the response.

For example, there may be provided a correspondence table matching a certain response to a certain action. Such a correspondence table may be pre-stored in the server such that the plug-in may pull the necessary data in relation to the response being processed in real-time through the network, or may be pre-stored locally in the user's device for, for example, faster operations.

The searching for the valid ad action may be implemented through a dedicated algorithm such as a response handling processing flow shown in step S405 in FIG. 4. If the plug-in 402 decides that there is no pre-determined ad action for the recognized response (i.e., "no match" case), then the main app loop may resume as shown in step S406. On the other hand, if there is a valid ad action (i.e., "action match" case), then the plug-in 402 starts an action processing flow, as represented in step S408.

However, if the matched ad action requires receiving more of a response from the user (such as get feedback, etc.), as represented in step S407, then the plug-in 402 and the VR 403 initiate the "receive response (RR)" steps as represented in step S420.

More specifically, at step S409, after the plug-in 402 has decided that the matched ad action requires receipt of further user response, the plug-in 402 resets the VR 403, which turns on the VR to be ready to listen to the microphone of the user's device, as represented in step S416.

As indicated in step S420 and in similar step S308 shown in FIG. 3, as soon as the VR 403 is activated in step S416, the user can interrupt the content being played at any time and input an audio command, which includes the times during which the "tell me more" content is being played, e.g., step S410. For example, if the user makes an utterance with sufficient decibels to be recognized as an audio input, the plug-in 402 will stop playing the "tell me more" content, and simultaneously the VR 403 will accept the user's utterance as an audio command, in other words, the user may 'barge-in' to input an audio command while the content is being played. The user may also input a response at times defined in steps S409-S414 as will be explained below.

At S410, the pre-stored "tell me more" content is played on the user's device. Such a "tell me more" content may be pre-stored in the server such that the plug-in 402 may pull the necessary data in relation to the response being processed in real-time through the network, or may be pre-stored locally in the user's device for, for example, faster operations.

At S411, after the "tell me more" content has been played, the plug-in 402 makes a signal to the user 401 indicating that the user may respond now and pauses for up to P1 seconds after the signal.

At S412, after the P1 seconds have passed, the plug-in 402 removes or hides the visual/graphic data of the "tell me more" content and returns control of the audio to the device/player so that the regular content (e.g., from the publisher application) is resumed.

At S413, even after the regular content is resumed, the plug-in 402 can still receive the user's audio commands for up to P2 seconds.

At S414, after P2 seconds have passed, the plug-in 402 turns off the speech recognizer (VR) 403, and then the VR 403 stops listening to the microphone of the user's device, as represented in step S417. At S415, after the plug-in 402 has turned off the VR 403, the main loop processing flow may resume. These predetermined parameters P1 and P2 may each have a default value but may also be modified by the user, user's device, plug-in, publisher application, server, and/or the creator of the advertising content such as the advertiser.

Further, immediately after the step S407 when the plug-in 402 starts playing the audio portion of the "tell me more" content as well as displaying the visual portion of the "tell me more" content on the user's device, the user may make a response at any time by inputting either or both the audio command, text command, selection command or any equivalent thereof, as represented in step S420 in FIG. 4.

At S421, if the user inputs a response to the advertising content, an action processing flow starts, as represented in step S422. If the user does not input any response, the main app loop may resume, as represented in step S415.

As noted above, an action processing flow may occur when user's inputted response has a matching valid action, and the associated components in the system (e.g., plug-in, server, application, advertiser, etc.) execute the action processing flow to actually perform the matching valid action. An example of such an action processing flow is shown in FIG. 5.

Figure 5:
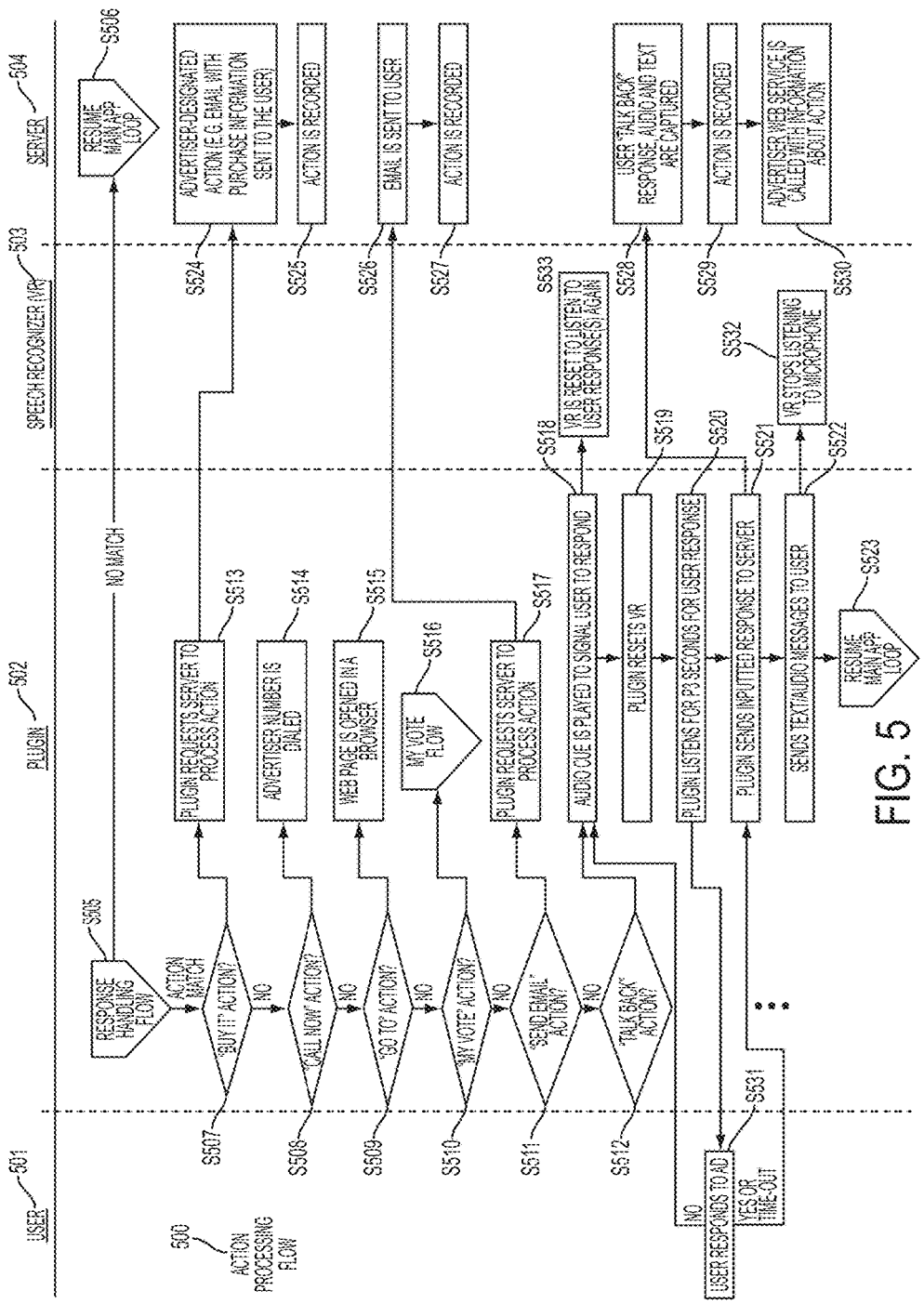
FIG. 5 illustrates an example of an action processing flow chart that may apply to, for example, step S422 and/or S408 in FIG. 4, in accordance with some embodiments described herein.

FIG. 5 schematically shows an example of an action processing flow chart that may apply to, for example, step S422 and/or S408 in FIG. 4, in accordance with some embodiments described herein. In the example shown in FIG. 5, user 501 may correspond to the user 104 in the interactive advertising system 100 in FIG. 1, plug-in 502 in FIG. 5 may correspond to the plug-in 102 in FIG. 1, voice-recognizer (VR) 503 in FIG. 5 may correspond to the speech recognizer (VR) 103 in FIG. 1, and server 504 in FIG. 5 may correspond to the server 101 in FIG. 1.

Further, the action processing flow 500 shown in FIG. 5 may apply to step S422 and/or S408 in FIG. 4, in which case the user 501 in FIG. 5 may correspond to the user 401 in FIG. 4, the plug-in 502 in FIG. 5 may correspond to the plug-in 402 in FIG. 4, and the VR 503 in FIG. 5 may correspond to the VR 403 in FIG. 4.

The action processing flow 500 starts with step S505 when it is determined whether the user's inputted response has a matching valid action. This step is referred to as a response handling flow. An example of such a response handling flow will be explained below with reference to FIG. 8.

If the user's inputted response has no valid matching action, the main app loop may resume, as represented in step S506. If there is a matching action, the system determines which one of the pre-determined actions is the matching action for the user, what are the requirements and/or criteria for the matching action, and which other components should be activated and/or notified to execute the matching action, and other actions, etc. An example of such a determination is represented in steps S507-S512.

First, at S507, the system determines whether the matching action is a "buy it" action, and if the answer is positive, the plug-in 502 requests the server 504 to process the "buy it" action. The "buy it" action is an action that is pre-stored in the server, and an individual advertiser may customize the "buy it" action associated with its corresponding advertising content.

For example, an advertiser A may create and store an advertising content A in the server for a specific target audience, and designate that the corresponding "buy it" action for the advertising content A causes the server to send an email to the user, who has made a response associated with the "buy it" action, including the purchase information (e.g., payment method, link to payment webpage, etc.).

In another example, an advertiser B may create and store an advertising content B in the server for a different specific target audience, and designate that the corresponding "buy it" action for the advertising content B causes the server to notify the advertiser B, for example, to initiate an automated order call for the user, etc. As such, the "buy it" action may be customized for each advertiser, or for each different target audience group, or depending on the user's characteristics such as the user's current location, registered address, age, etc.

In the exemplary processing flow 500, in response to the "buy-it" action determined in step S507, the server 504 sends an email to the user with purchase information as shown in step S524. After the email has been sent, the server 504 records the action, as shown in step S525.

If the matching action is not a "buy it" action, then the system determines whether it is a "call now" action, as shown in step S508. If it is a "call now" action, then the advertiser's phone number is automatically dialed on the user's device, as shown in step S514. The advertiser's phone number may be pre-included in the advertising content such that the plug-in does not need to contact the server again to get the information on the advertiser's number.

Additionally or alternatively, one or more relevant phone numbers may be looked up in real time based on the user's location or other specifics. The look-up process of phone numbers may be done locally on the user's device or remotely on the server in which case the relevant information may be transmitted between the user's device and the server through the network.

If the matching action is not a "call now" action, then the system determines whether it is a "go to" action, as shown in step S509. If it is a "go to" action, then the advertiser-designated webpage is automatically opened on the user's device, as shown in step S515. The advertiser-designated webpage may be pre-included in the advertising content such that the plug-in does not need to contact the server again to get the information on the advertiser-designated webpage.

If the matching action is not a "go to" action, then the system determines whether it is a "my vote" action, as shown in step S510. If it is a "my vote" action, then the my vote processing flow is triggered to run, as shown in step S516. An example of such processing flow will be explained below with reference to FIG. 7.

If the matching action is not a "my vote" action, then the system determines whether it is a "send email" action, as shown in step S511. If it is a "send email" action, then the plug-in 502 transmits a request to the server 504 to process the action, as shown in step S517. The server 504, after receiving the request, sends an email to the user. The format and content of the email may be pre-designated by the advertiser. After the email has been sent, the server records the action, as shown in step S527.

If the matching action is not a "send email" action, then the system determines whether it is a "talk back" action, as shown in step S512. If it is a "talk back" action, then the plug-in should reset the associated components to get ready to listen to the user's further feedback. Although not explicitly shown in FIG. 5, there may be additional commands and/or action phrases that may be added to the system such as, non-exclusively, "take picture," "need help," "remind me later," etc.

In the example shown in FIG. 5, after the determination has been made that the matching action is a "talk back" action at S512, the system provides an audio cue to the user (e.g., on the user's device) to signal the user to input his or her feedback, as shown in step S518. Simultaneously, the speech recognizer (VR) 503 is also reset or activated to recognize the user's audio inputs, as shown in step S533 and step S519.

At S520, the plug-in 502 waits for a predetermined number of seconds, e.g., P3 seconds, for the user to make a response. This predetermined parameter P3 may have a default value but may also be modified by the user, user's device, plug-in, publisher application, server, and/or the creator of the advertising content such as the advertiser. For example, P3 may be any value such as 10, 10.5, 11, 12, 13, 14, 15, 16, 17, 18, 19, or any other non-negative value.

P3 may be defined longer than other parameters P1 and P2 because the "talk back" processing associated with P3 is used to receive the user's feedback, which will be lengthier than simple commands, in general.

At S531, the user may input feedback or a further response to the advertising content during the response time, P3. If the user makes a response before the response time runs out, the speech recognizer (VR) 503 recognizes the user-inputted response and notifies the plug-in 502 of the response.

Here, the VR 503 may also return the corresponding text-version to the user. At S521, the plug-in then transmits this decrypted response, having been inputted by the user and decrypted by the VR 503 in case the input was in audio data, to the server 504.

The server 504 then captures the user's response that may comprise the audio and text data as shown in step S528, records this action as shown in step S529, and then notifies the corresponding advertiser of the captured and stored user's feedback.

Any notification method may be used, including, but not limited to, telephone, fax, email, instant message, etc. A preferred notification method may be pre-designated by the individual advertiser, or may be customized based on the user's characteristics, advertiser's characteristics, etc., depending on the technical and design needs of the system.

For example, the notification may be used to allow the advertiser to take further action based on the user's response and/or action. The further action by the advertiser may include a wide range of actions including, but not limited to, a simple return call to the user, sending an email with a link to the shopping cart with the requested item included, and running a separate program or algorithm (e.g., streaming a customized content to the user, providing more options to the user to interact with the advertiser, etc.) using, for example, an advertising application that may be dynamically downloaded to the user's device through connectivity to the network and the server. An example of such an advertising application is shown in element 111*a* in FIG. 1, which could be written in languages such as HTML and JavaScript and dynamically downloaded and launched as advertiser app 111*b* by a browser/interpreter within the server plug-in 102 to leverage sophisticated device/Xapp-enabled capabilities such as audio capture, speech recognition and audio playing.

At S522, the recognized user's message that may comprise either or both the text and audio data may be returned to the user, for example, for confirmation. If confirmed, the VR 503 may be deactivated to stop listening to the microphone of the user's device. Then, at S523, the main app loop may resume. As noted earlier, the return of the user-inputted message may be performed before or at the same time with step S521.

Further, the particular sequence of the process of determining the matching action in steps S507-S512 is neither necessary nor required for the practice of the present invention. In fact, the sequence may be modified in any way as will be desired for a particular set of technical and design needs.

Figure 6:
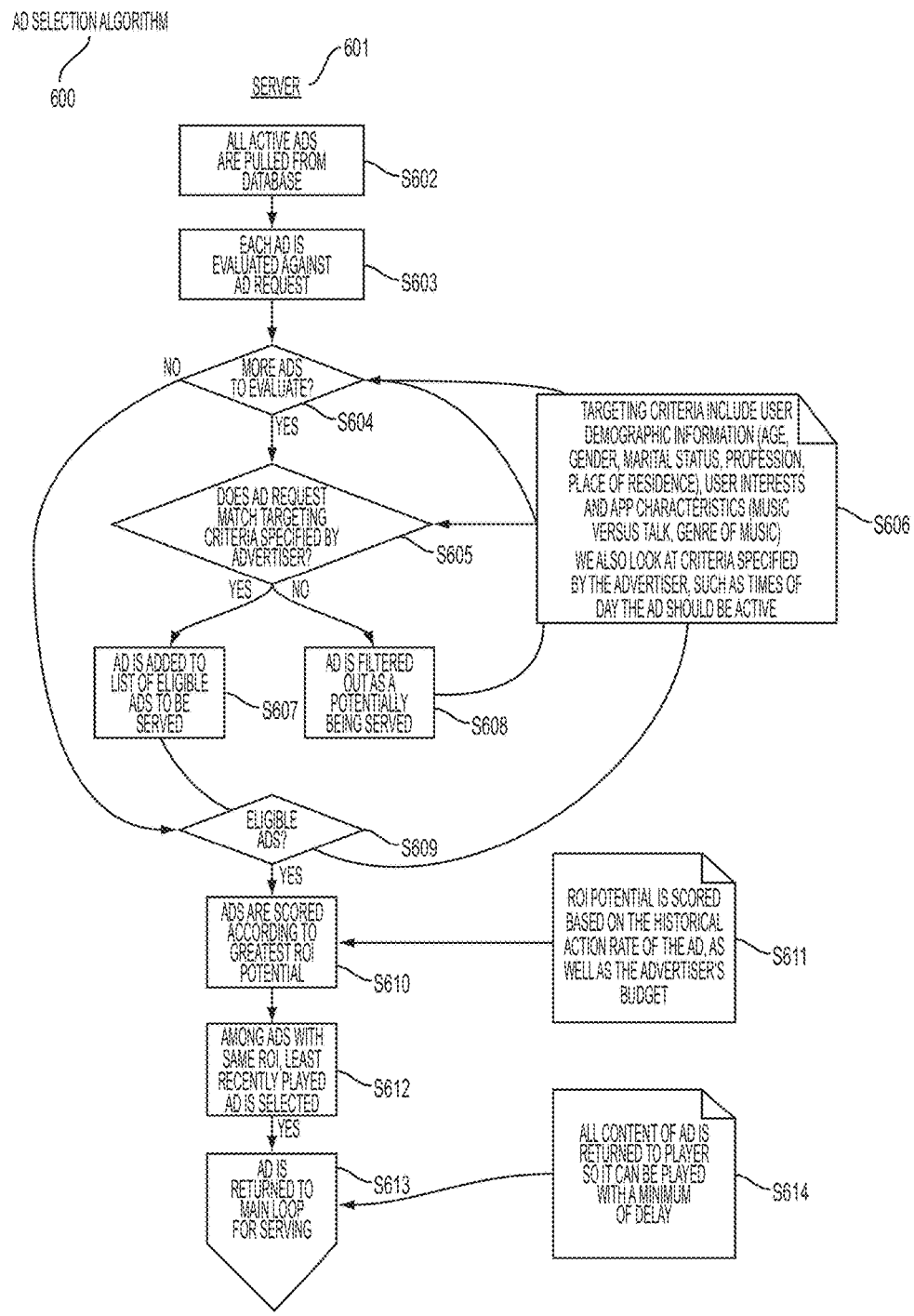
FIG. 6 illustrates an example of an ad selection algorithm that may apply to step S208 in FIG. 2, in accordance with some embodiments described herein.

FIG. 6 schematically shows an example of an ad selection algorithm that may apply to step S208 in FIG. 2, in accordance with some embodiments described herein. The ad selection algorithm 600 in FIG. 6 may be a computer program stored on a server 601, which causes the server 601 to perform the steps S602-S614, when executed.

The server 601 may correspond to the server 101 in the interactive advertising system 100 in FIG. 1, and/or to the server 203 in FIG. 2. Further, the server 601 may be the same server that is referred in other processing flows in FIGS. 3-5, or a different server.

The advertisements may be created and approved by the advertisers to be pre-stored in database of server 601. Then, the ad selection algorithm 600 that selects target advertising content for a particular user request starts with step S602 by pulling all active ads from the database.

At S603, each active ad is evaluated against the ad request transmitted to the server 601 via the network as well as the advertiser's pre-defined target criteria pre-stored in the server 601. This evaluation process is repeated until there are no more ads to evaluate, as shown in step S604. Specifically, the evaluation may be considered as a two-way evaluation. On one hand, the active advertising contents are evaluated against certain criteria embedded in, or associated with, the ad request.

For example, the ad request is first prompted by the publisher application on the user's device, and then transmitted by the plug-in on the user's device to the external server via the network. Here, before the request is transmitted to the server, the publisher application and/or the plug-in may include certain criteria for the advertisements (e.g., certain type of items, price range, etc.) in the request.

When the server receives the ad request, it also receives the ad criteria. The ad criteria may be pre-defined and/or modified by the user operating the device. Based on these criteria, the server pulls a group of active advertising contents that meet the criteria.

Subsequently, the server evaluates the ad request against the target-audience criteria of each of the pulled advertising contents, as represented in steps S605 and S606. The target-audience criteria may include user demographic information such as age, gender, marital status, profession, place of residence, or any other similar factor), application characteristics (e.g., music versus talk, genre of music, or any other similar factor), device characteristics (e.g., current location, network it belongs to, or any other similar factor), and/or other miscellaneous characteristics, including, but not limited to, time of the day, weather, etc. Such target-audience criteria may be pre-designated by the advertiser and stored in the server 601.

At S608, if there are no eligible ads that meet the requirements of the two-way evaluation, the server 601 repeats the second evaluation (i.e., the evaluation of the ad request against the target-audience criteria) with lower standards. The preference and/or weight of each factor in the target-audience criteria is also pre-designated by the advertiser and stored in the server 601. This process repeats until there is an eligible ad that meets the two-way evaluation.

At S607, if there are one or more eligible ads that meet the requirements of the two-way evaluation, those ads are ready to be served (e.g., to be transmitted to the user's device for play). More specifically, if there is only one eligible ad, the ad is immediately transferred to the user's device (e.g., to be received by the plug-in) for play.

If there are two or more eligible ads, the ad selection algorithm 600 may proceed to step S610, where each eligible ad is further evaluated based on a different set of criteria to be provided with a "ROI-score," as shown in step S610 in FIG. 6. The "ROI" may represent the 'Return on Investment' on a particular ad being evaluated. For example, the ROI criteria may include, non-exclusively, the historical action rate of the ad, advertiser's pre-designated budget, etc., as shown in step S611. The ad with a higher ROI-score can then be selected and transmitted to the user's device for service.

If two or more ads have the same ROI-score, the ad that was least recently played can be selected and transmitted to the user's device for service, as shown in step S612.

At S613, the selected ad is returned to the user's device (e.g., received by the plug-in) via the network such that the publisher application and/or the plug-in on the user's device may service the selected ad when the ad-break time occurs. Further, after an ad is selected, the entire content of the selected ad may be transmitted at once to the user's device in order to reduce the delay time on the user's end when servicing the ad content.

Figure 7:
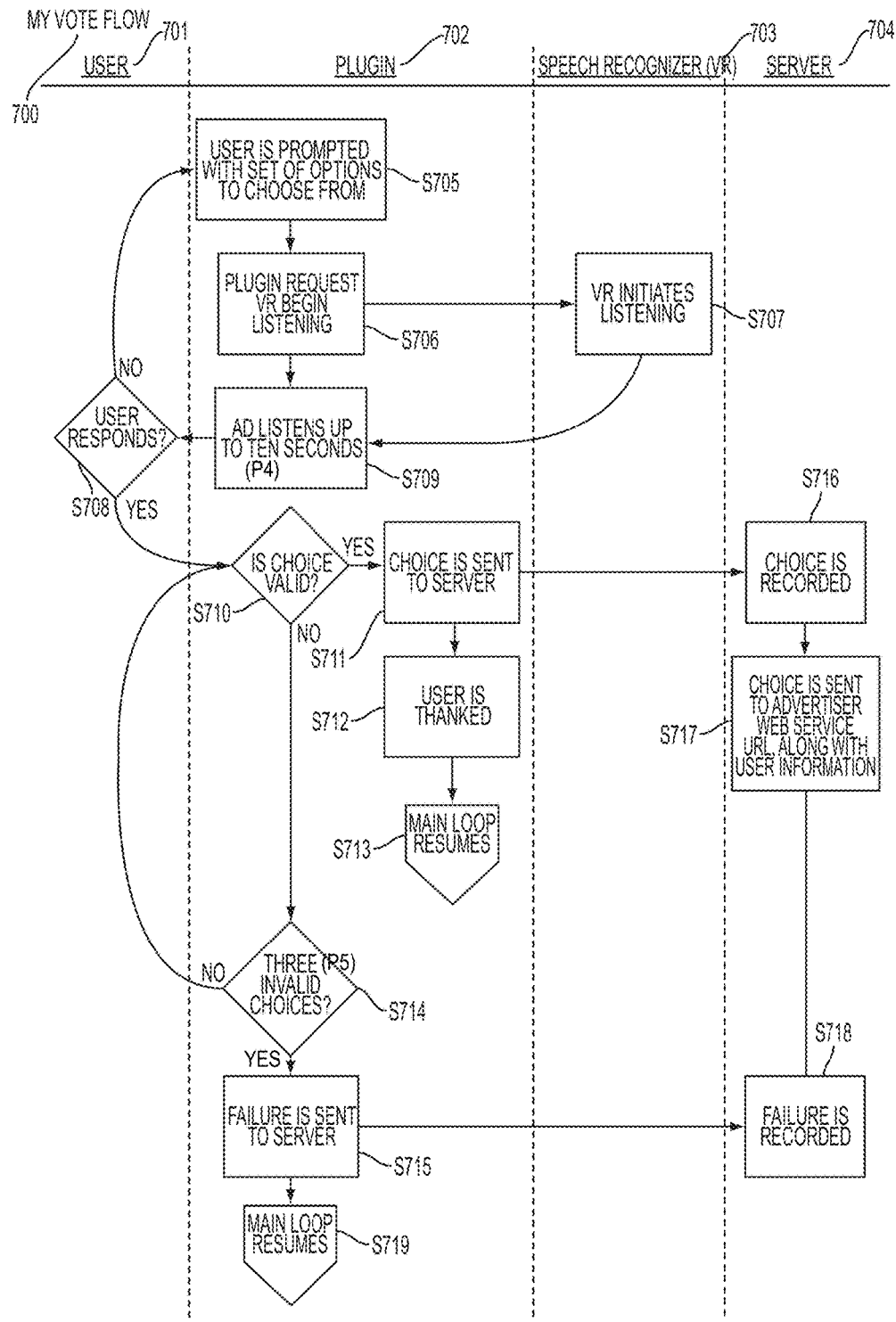
FIG. 7 illustrates an example of a "my vote" processing flow chart that may apply to step S516 in FIG. 5 in response to a "my vote action," in accordance with some embodiments described herein.

FIG. 7 schematically shows an example of a "my vote" processing flow chart that may apply to step S516 in FIG. 5 in response to a "my vote action," in accordance with some embodiments described herein. The "my vote" processing flow 700 is an example of a processing flow to perform an action that is triggered by a particular user's response associated with this "my vote" command and/or action.

This processing flow may be used to prompt the user to make a choice among the list of pre-defined items, where an item may be a particular action to be performed by the plug-in, the server, or the advertiser, or an advertised item, or any selectable choice as may be defined or customized for each advertiser, and/or user.

In the example shown in FIG. 7, user 701 may correspond to the user 104 in the interactive advertising system 100 in FIG. 1, plug-in 702 in FIG. 7 may correspond to plug-in 102 in FIG. 1, voice-recognizer (VR) 703 in FIG. 7 may correspond to speech recognizer (VR) 103 in FIG. 1, and server 704 in FIG. 7 may correspond to server 101 in FIG. 1.

Further, the "my vote" processing flow 700 shown in FIG. 7 may apply to step S516 in FIG. 5, in which case the user 701 in FIG. 7 may correspond to the user 501 in FIG. 5, the plug-in 702 in FIG. 7 may correspond to the plug-in 502 in FIG. 5, the VR 703 in FIG. 7 may correspond to the VR 503 in FIG. 5, and the server 704 in FIG. 7 may correspond to the server 504 in FIG. 5.

The "my vote" processing flow 700 starts with step S705, where the user is prompted with set of options to choose from. The prompt may be implemented using either or both an audio file and a visual/graphic notification.

At S706, upon the prompt, the plug-in 702 resets the speech recognizer (VR) 703, in response to which the VR 703 is activated as shown in step S707. The VR 703 waits a predetermined number of seconds, P4 seconds, to receive the user's response (e.g., choice), as shown in step S709.

The predetermined parameter P4 may have a default value but may also be modified by the user, user's device, plug-in, publisher application, server, and/or the creator of the advertising content such as the advertiser. For example, P4 may be any value such as 7, 8, 9, 10, 10.5, 11, 12, 13, 14, 15, 16, 17, 18, 19, or any other non-negative value.

At S708, if the user does not make a response within the predetermined time period, the flow goes back to step S705 and prompts the user again. This second prompt may be the same as the first prompt, or may be modified, for example, to provide a stronger prompt to the user.

At S708, if the user makes a response during the predetermined time period, the speech recognizer (VR) 703 recognizes and processes (e.g., decrypts) the user's response, and then the system (e.g., plug-in) determines whether the user's response is a valid choice, as represented in step S710.

At S711, if the user's response is a valid choice, then the user's choice is transmitted to the server 704 via the network. At S716, upon receiving the user's choice, the server 704 records it first, and then sends it to the corresponding advertiser (e.g., advertiser-designated web service URL, or any destination that the corresponding advertiser has previously designated) along with the user's information, as shown in step S717.

Simultaneously, on the plug-in's end, the user may be notified of an appreciation message for participating, and then, subsequently, the main loop app may resume, as shown in steps S712 and S713 in FIG. 7.

At S710, if the recognized user's response does not include a valid choice, the system may return a failure message to the user and prompt the user again for a response, as shown in step S705.

If there has been more than a predetermined number of failures (e.g., P5 number of failures) in making a valid choice, which determination is made in step S714 in the exemplary "my vote" processing flow 700 shown in FIG. 7, the system may stop repeating the loop and proceed to transmit a failure message to the server, as shown in step S715.

The predetermined parameter P5 may have a default value such as three (3), but may also be modified by the user, user's device, plug-in, publisher application, server, and/or the creator of the advertising content such as the advertiser. For example, P5 may be any value such as 0, 1, 2, 3, 4, 5, or any other non-negative, integer value.

At S718, upon receiving the failure message, the server 704 first records the failure message and then sends it to the corresponding advertiser (e.g., advertiser-designated web service URL, or any destination that the corresponding advertiser has previously designated) along with the user's information, as shown in step S717.

Simultaneously, on the plug-in's end, the "my vote" processing flow 700 closes and the main app loop may resume, as shown in step S719.

Figure 8:
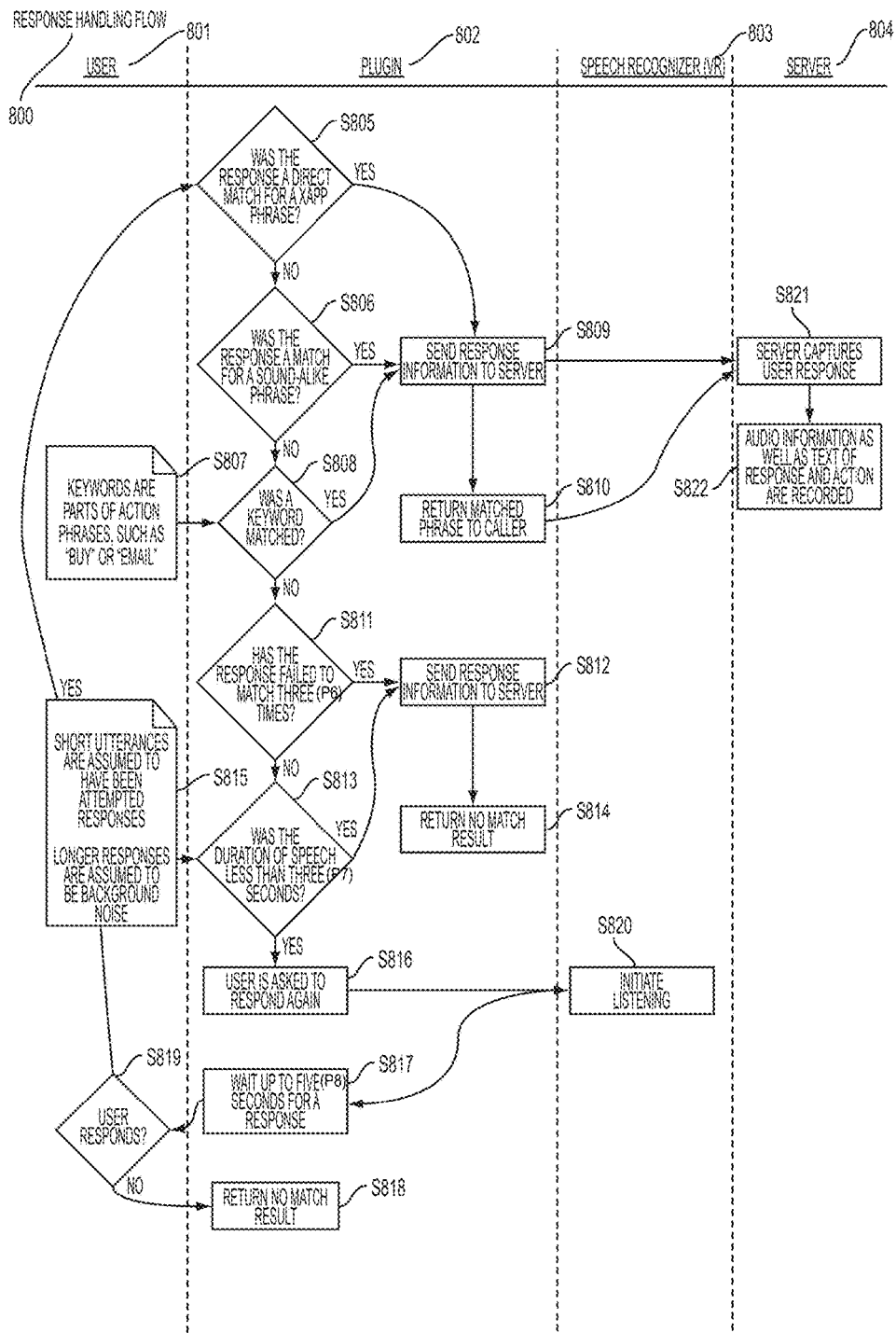
FIG. 8 illustrates an example of a response handling flow chart that may be apply to step S405 in FIG. 4 and/or step S505 in FIG. 5, in accordance with some embodiments described herein.

FIG. 8 schematically shows an example of a response handling flow chart that may apply to step S405 in FIG. 4 and/or step S505 in FIG. 5, in accordance with some embodiments described herein. As previously-noted with reference to FIGS. 4 and 5, the response handling processing flow 800 may be used to determine whether the user's inputted response (recognized by the speech recognizer) has a valid matching action associated with the user's inputted response.

In the example shown in FIG. 8, user 801 may correspond to the user 104 in the interactive advertising system 100 in FIG. 1, plug-in 802 in FIG. 8 may correspond to plug-in 102 in FIG. 1, speech recognizer (VR) 803 in FIG. 8 may correspond to the VR 103 in FIG. 1, and server 804 in FIG. 8 may correspond to the server 101 in FIG. 1.

Further, the response handling processing flow 800 shown in FIG. 8 may apply to step S405 in FIG. 4 and/or step S505 in FIG. 5, in which case the user 801 in FIG. 8 may correspond to the user 401 in FIG. 4 and/or user 501 in FIG. 5, the plug-in 802 in FIG. 8 may correspond to the plug-in 402 in FIG. 4 and/or plug-in 502 in FIG. 5, the VR 803 in FIG. 8 may correspond to the VR 403 in FIG. 4 and/or the VR 503 in FIG. 5, and the server 804 in FIG. 8 may correspond to the server 504 in FIG. 5.

The response handling processing flow 800 starts with step S805 where the system makes a determination whether the recognized user's response is corresponding to, or associated with, any of the pre-defined command phrases. The list of pre-defined command phrases may be stored in the plug-in, for example, during the installation of the plug-in in the user's device. Further, the plug-in 802 (including, but not limited to, the list of the pre-defined phrases) may be updated (either periodically or per request) from the server 804, as any update or modification to the interactive advertising system is made.

At S809, if the recognized user's response is corresponding to, or associated with, any of the pre-defined command phrases, then the information about the recognized user's response is transmitted to the server 804 through the network. At S821, upon receiving this response information, the server 804 captures and stores the response in either or both the audio format and the corresponding text format, as represented in step S822.

Simultaneously, on the plug-in's end, the matched action phrase is returned to the user, for example, for notification and/or confirmation, as shown in step S810.

At S806, if the recognized user's response is not corresponding to, or associated with, with any of the pre-defined command phrases, then the system further determines whether the recognized user's response is corresponding to, or associated with, a sound-alike command phrase. The sound-alike phrases are the phrases that sound similar to the pre-defined command phrases. If there is a match for such a sound-alike phrase of any particular predefined command phrase, this causes the system to determine that the user's response is calling for that pre-defined command phrase and returns to step 809.

In other words, the system transmits the user's response in its native form along with information indicating that the user's response is calling for the pre-defined command phrase that was determined at S806.

At S808, if the recognized user's response is not a match for a sound-alike phrase of any of the pre-defined phrases, then the system further determines whether the recognized user's response includes any one of the pre-defined keywords. One or more keywords that are parts of the pre-defined action phrases may be pre-stored for triggering the corresponding action phrases. The keywords may be pre-stored for each of the pre-defined action phrases. For example, for the action phase "buy it," the keyword may be "buy," and similarly, for the action phrase "send email," the keyword may be "email," as described in block S807. There may be more than one keyword for one action phrase.

TABLE 1 below shows an example of a correspondence table among the action phrases, corresponding actions triggered by each of the action phrases, and sound-alike or keywords that do not exactly match the action phrases but can still trigger the corresponding actions.

TABLE 1

An exemplary correspondence table

| Action Phrase | Action Triggered | Other words users may use to make the same response |
|---|---|---|
| Say "TELL ME MORE" to hear the details | Triggers information audio (generic) | More info, more, info, any custom phrase (e.g., brand name), etc. |
| Just say "XXXX ME" (custom phrase) to learn more | Triggers information audio (branded) | More info, more, info, "XXXX", any custom phrase (e.g., brand name), etc. |
| Say "CALL NOW" to speak to an agent | Triggers call activation to advertiser | Agent, call, salesperson, etc. |
| Say "SEND EMAIL" to get the get more information | Triggers email response from advertiser and/or server | Send it to me, text me, etc. |
| Say "BUY IT" to purchase now | Triggers purchase process | Buy now, purchase, get it, I'll take it, etc. |
| Say "GO TO" the webpage to see the offer | Triggers mobile browser launch | Web page, website, etc. |
| Say "MY VOTE" to participate | Triggers list of choices for a poll, vote, or smack down | Ask me, my choice, etc. |
| Say "TALK BACK" to let us know what you think | Triggers 15 second free form response | Feedback, etc. |
| Say "INSTALL APP" to download now | Triggers mobile app to be downloaded and cued for installation on user's device | Download App, etc. |

As shown in Table 1, action phrases may include a fabricated word or phrase, as represented in Table 1 by "XXXX". The fabricated word or phrase may be a custom word that is customized for a particular product, user, system, publisher, advertising content, or any similar factor.

The fabricated word or phrase may also include a word or phrase that is made up or invented by system designers, publishers, or any other entities. The fabricated word or phrase may further be a brand name, a product name, a trademark, an oronym, a homophone, etc. For example, a fabricated phrase, "xappme" (pronounced "zap me"), may be associated with a particular action (e.g., triggering more information, or any action that is frequently used by users, etc.) for convenience of the users.

The fabricated word or phrase may be intentionally chosen to be the one that is not used often in everyday speech such that the fabricated word or phrase is exclusively associated with a command for the interactive advertising system. The exclusive association is possible because the fabricated word or phase is selected to the one that is not used often in people's everyday speech, and therefore, is not likely used as a command phrase for other applications unrelated to the interactive advertising system.

Such a feature may help prevent the voice-recognizing system in the device from being confused between a command in the interactive advertising system and a command in other applications unrelated to the interactive advertising system. This feature allowing an easy recognition of a command for the interactive advertising may help better distinguish valid commands for the interactive advertising system from mere noises or other unrelated commands, and consequently, reduce false-positive commands and associated operational errors in the system.

If there is a matching keyword in the recognized user's response, the corresponding action phrase is transmitted to the server, as shown in step S809, and the matched action phrase is returned to the user, for example, for notification and/or confirmation, as shown in step S810.

If there is no matching keyword, the system then determines whether the failure to find a matching action phrase for the user's response has repeated more than a predetermined number of times, e.g., P6 times.

The predetermined parameter P6 may have a default value such as three (3), but may also be modified by the user, user's device, plug-in, publisher application, server, and/or the creator of the advertising content such as the advertiser. For example, P6 may be any value such as 0, 1, 2, 3, 4, 5, or any other non-negative, integer value.

At S811, if the failure has repeated more than P6 times, the plug-in transmits the user's response to the server along with the information indicating the failure to find a matching action phrase for the user's response, as shown in step S812. Upon receiving the user's response and the failure information from the plug-in through the network, the server 804 still captures and stores the user's response in either or both the audio format and the corresponding text format, as shown in steps S821 and S822.

Simultaneously, on the plug-in's end, the failure message is returned to the user as notification as shown in step S814. If the failure has not repeated more than P6 times as determined in step S811, the system determines whether the duration of the user's audio file (e.g., representing the user's speech or response) was less than a predetermined length (e.g., P7 seconds), as shown in step S813.

The predetermined parameter P7 may have a default value such as three (3), but may also be modified by the user, user's device, plug-in, publisher application, server, and/or the creator of the advertising content such as the advertiser. For example, P7 may be any value such as 1.5, 2, 2.5, 3, 3.5, 4, 4.5, or any other non-negative value.

As represented in block S815, short utterances by the user may be associated with potential, attempted responses by the user, whereas long utterances by the user may be associated with mere background noises. Accordingly, at S813, if the duration of the user's audio file was less than P7 seconds, then the user is asked to respond again for clarification, as represented in step S816. Then, the speech recognizer 803 is activated, as shown in step S820. An example of how the speech recognizer 803 may receive and recognize the user's audio command is explained above with reference to the "receive response" steps, as represented in, for example, step S308 (including steps S309-S314) in FIG. 3, and/or step S420 (including steps S409-S414) in FIG. 4.

In the exemplary response handling flow 800 shown in FIG. 8, the plug-in 802 may wait up to a predetermined number of seconds (e.g., P8 seconds) after the speech recognizer 803 has been initiated, as shown in step S817.

The predetermined parameter P8 may have a default value such as five (5), but may also be modified by the user, user's device, plug-in, publisher application, server, and/or the creator of the advertising content such as the advertiser. For example, P8 may be any value such as 1.5, 2, 2.5, 3, 3.5, 4, 4.5, or any other non-negative value.

If the user makes a new response within P8 seconds, then the system repeats the loop from the step S805 to search for a matching action phrase for the newly inputted user's response. If the user does not make a new response within P8 seconds, then the plug-in 802 returns a match-failure message to the user 801, as represented in step S818. This step may be the same as the steps S812 and S814, or simpler such that S818 does not cause the plug-in 802 to transmit the failure message to the server 804.

In accordance with the above disclosure, the system (e.g., plug-in and speech recognizer) may be able to recognize and process a user's audio command, even if the command does not exactly match the pre-defined phrases.

FIG. 9 shows an example of a screenshot of an ad manager application, in accordance with some embodiments described herein. An ad manager application may be used by individual advertisers to customize their corresponding advertising contents or any information associated with the content.

For example, this application may allow individual advertisers to connect to the server through the network and to store/change/remove any information associated with their corresponding advertising content, or even to make a link between the server in the network and their own local server such that, for example, the server in the network may trigger a certain action on the local server, or vice versa.

In the example shown in FIG. 9, element 910 shows an exemplary screenshot of an ad manager where an ad audio file, an ad image, a scrolling text, and a target URL may be customized for individual advertisers.

On the other hand, element 920 shows an exemplary screenshot of an ad manager where the definition of actions corresponding to various different command action phrases (e.g., tell me more, buy it, call now, send email, go to, my vote, talk back) may be customized for individual advertisers.

The actions may include a wide range of custom functionalities, such as, non-exclusively, playing a custom audio file, running a custom algorithm or program, connecting to the local server of the advertiser, calling a pre-defined number, calling a number that is searched in real time, opening a pre-defined webpage on the user's device, opening a webpage that is searched in real time, etc.

Further, the application may also allow users to define an alias for one or more specific actions. In the example shown in the screenshot 920, the application allows users to define an alias for the "tell me more" action. The alias may be a fabricated phrase, including, but not limited to, a brand name, a product name, a trademark, an oronym, a homophone, etc.

FIG. 10 shows an example of a screenshot of a campaign manager application, in accordance with some embodiments described herein. The interactive advertising system explained above delivers advertisements to users for advertisers based on fulfilling terms defined in a campaign, including, but not limited to, budget, ad(s), start date, end date, time-of-day, target age range, target, gender, keywords, location, cost per thousand impressions, cost per "tell me more", and cost per action. FIG. 10 shows an example of an interactive advertising system for a campaign.

In the example shown in FIG. 10, element 1010 shows an exemplary screenshot of a campaign manager on the 'general' tab where the name of campaign, campaign type, start and end dates, and/or time of day, may be customized for each campaign.

On the other hand, element 1020 shows an exemplary screenshot of a campaign manager on the 'targeting' tab, where the targeted audience may be customized based on various factors, including, but not limited to, the characteristics of users/listeners (e.g., age, gender, location, etc.), publisher applications running on users' devices (e.g., music, news, talk, etc.), native features of the users' devices (e.g., radio, tv, Bluetooth, headset, etc.), etc.

The screenshots shown in FIGS. 9 and 10 are provided only as examples, and many other characteristics, features, and/or functionalities may be added to the system in accordance with the claims and embodiments described herein through obvious modifications to the high and/or low-level designs of the system.

Techniques for Providing Interactive Content

Interactive content, as described above in reference to various examples and figures, recognize a user input (e.g., voice input, touch input) while the interactive content is being provided such that the user can make commands and/or initiate various operations while the content is being played. The commands may be directly related to the content being played. For example, while airline advertising content is played (e.g., in audio or video format), a user listening to the played advertising content can speak a command "call" or other action phrase for requesting a call. The device relates the call command with the played airline advertising content, obtains a phone number associated with the airline being advertised, and makes a call to that number. As explained above, a variety of different commands (e.g., "more info" "email" "more") may be used.

In some embodiments, the device does not implement a "barge-in" command system that allows a user to interrupt the content being played and speak a command while the content is being played. Instead, the device plays a message prompting the user to speak an action phrase, so that the user can simply repeat what has been said in the message. For example, the message may say "if you want to call now, say XXX." Then, the speech recognition engine may only tune in for that specific action phrase "XXX" to disregard any words or phrases that do not match the specific action phrase. This approach may help significantly increase the success rate of command recognition. Optionally, the message may prompt the user to choose between two or more action phrases, such as "if you want to call now, speak XXX, and if you want to receive a text or email with more information, speak YYY."

In some embodiments, the prompt message may be used to reduce the amount of time the speech recognition should remain activated, compared to the system where "barge-in" commands are permitted. To allow a barge-in command, the speech recognition should remain activated for the duration corresponding to the entire playback of the content. Instead, the prompt message notifying the user to speak at an indicated time (e.g., after the beep or sound) allows the speech recognition to remain turned off until the indicated time. This may reduce power consumption of the overall interactive system.

For example, the message may say "after the beep, speak XXX." While the message is played, the speech recognition engine may be put on a stand-by mode, and once the beep is played, the speech recognition engine may be activated. The speech recognition can then be activated for at least a predefined minimum time period. If any speech activity is detected, the speech recognition may remain activated for additional time periods. Optionally, there may be a predefined maximum time period for activation of the speech recognition such that if no recognizable command is detected within this period, the speech recognition is deactivated. The predefined maximum time period may be greater than 30 seconds, 40 seconds, 1 minute, 2 minutes, etc. The predefined maximum time period may be less than 30 seconds, 20 seconds, 15 seconds, etc. Optionally, a message notifying that the speech recognition will be deactivated after a certain amount of time is played to the users.

In response to receiving a recognizable voice command of the users, the device may perform an action responding to the detected voice command in "real-time." The meaning of responding to a voice command in "real-time" is used broadly to include at least the following instances, non-exclusively: responding to a voice command within a predetermined time period (e.g., instantly, within 10 seconds, within 1 minute, 2 minutes, 3 minutes, 4 minutes, etc.) after the voice command is received; responding to a voice command prior to resuming the silenced content; responding to a voice command at a designated future time, etc. The "real time" response is used in a sense that the voice command is recognized in real-time, and an appropriate action responding to the command is determined in real time subsequent to recognition of the command. The response is considered "real-time" as long as the appropriate instructions to perform the action is queued immediately after the command, regardless of whether the instructions call for an immediate execution of the action or later execution of the action at a time designated by the user, publisher, content, or other entities.

Attention is now directed to techniques of creating interactive content. In some embodiments, interactive content may be created by a single content provider. For example, an ad provider creates ad content that is interactive and provides the interactive ad content to the users as a single data source. In some other embodiments, interactive content may be achieved by taking conventional, non-interactive content and turning it into interactive content. This technique may find most value since many conventional content providers (e.g., broadcasters, radio stations, podcasts, etc.) are interested in increasing user involvement with their content by enabling their content to be interactive with user's voice commands. The below descriptions concern various techniques for turning the conventional, non-interactive content into interactive content.

1. Direct Insertion Technique

In some embodiments, the non-interactive content created by a conventional content provider may be directly modified to add interactive content in the middle of or at the end of the non-interactive content. This approach is called a direct insertion technique, as interactive content is directly inserted into the non-interactive content.

Figure 11A:
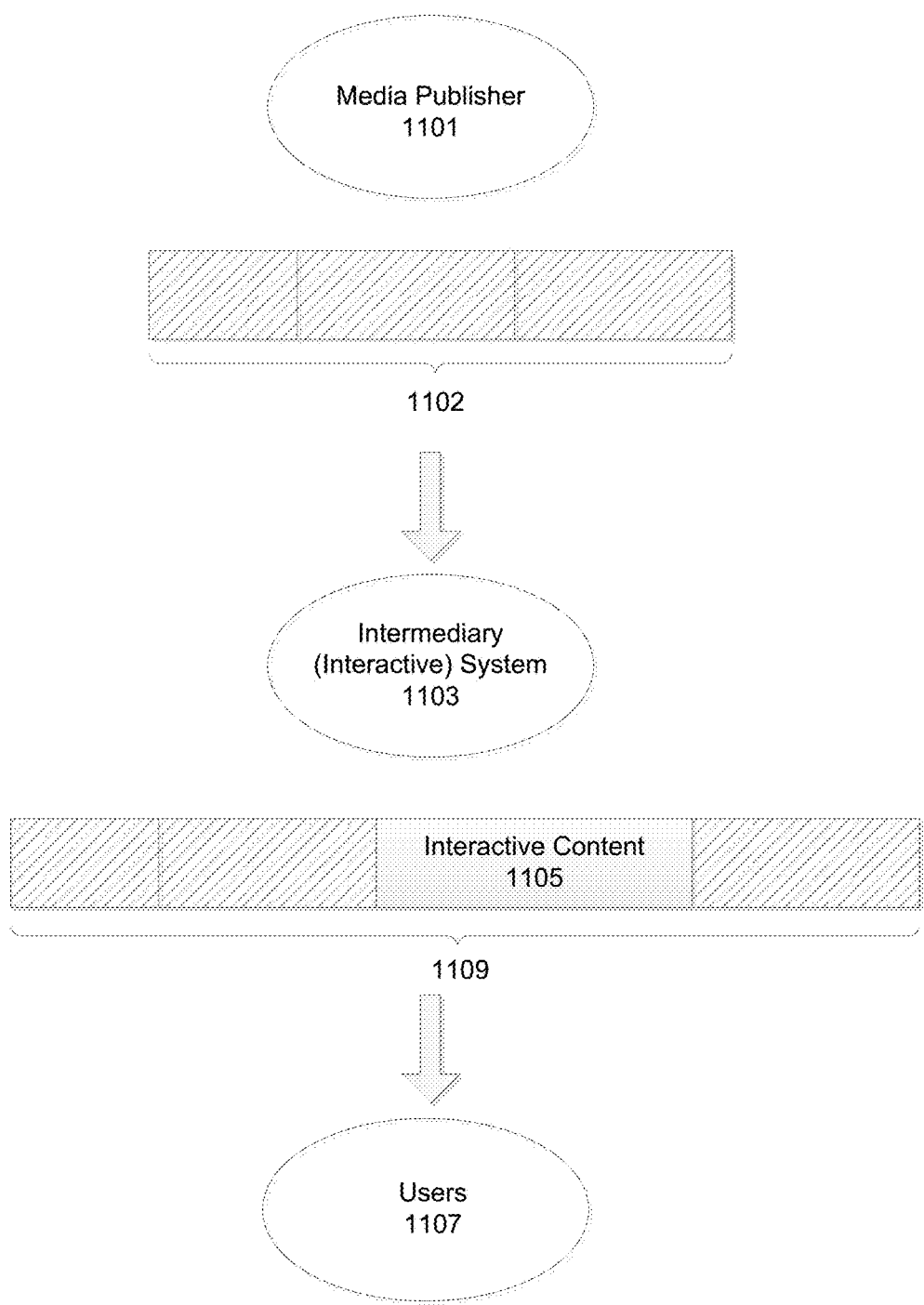
FIG. 11A illustrates an example of the modified content stream being streamed from the intermediary interactive system.
Figure 11B:
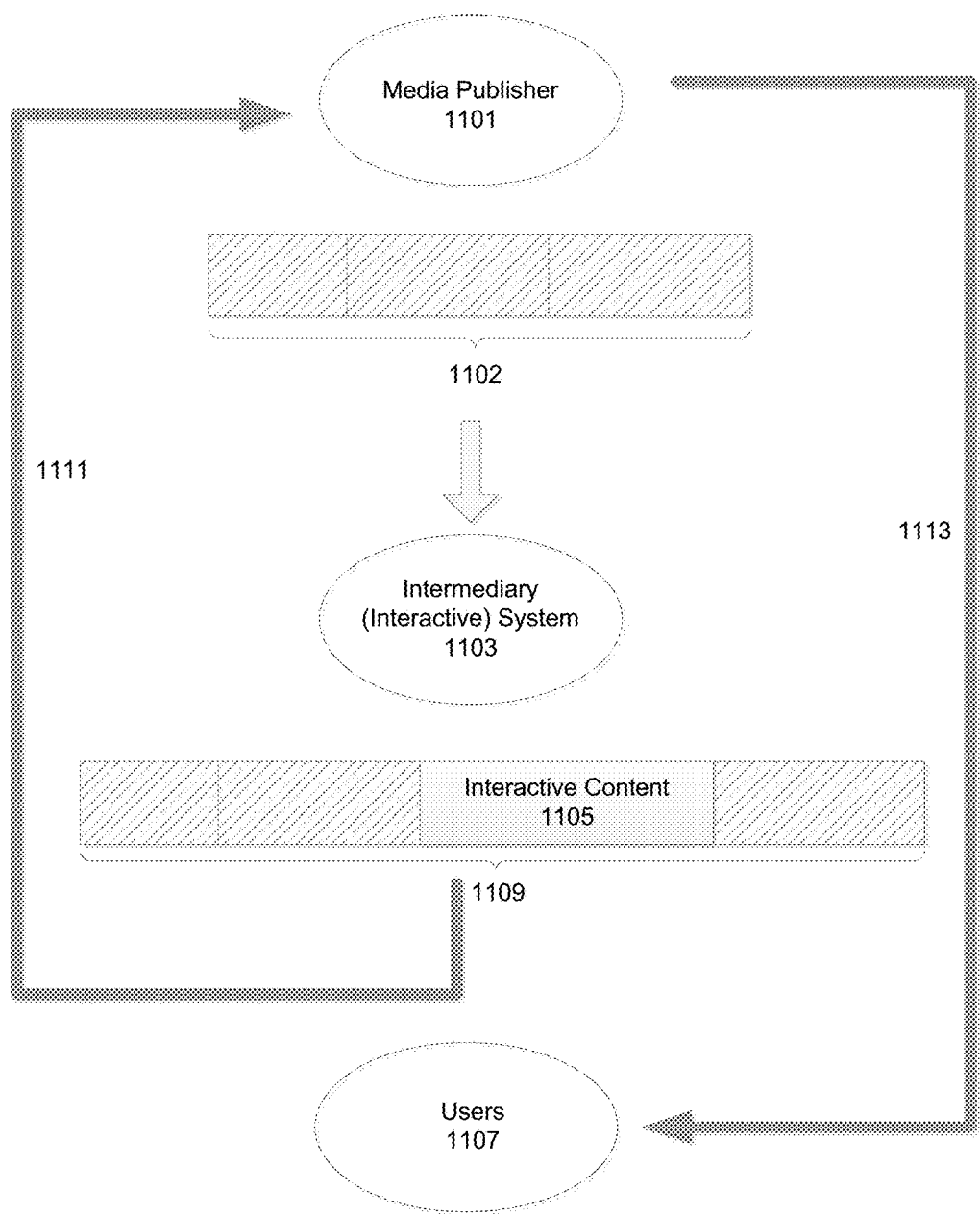
FIG. 11B illustrates an example of the modified content stream transmitted back to the publisher.

For example, as shown in FIG. 11A, an existing media publisher 1101 produces streaming content 1102 that does not include interactive content or otherwise have the ability to recognize user responses in real-time and respond accordingly. The original content is captured by a data capture device of intermediary interactive system 1103. The intermediary interactive system 1103 modifies the captured content to include one or more interactive contents 1105 at the appropriate locations. In the illustrated example, a single block of interactive content is inserted in the middle of the stream, but two or more interactive content blocks may be inserted at different locations of the main data stream 102. The modified content stream 1109, including both the original non-interactive content 1102 as well as the inserted interactive content 1105, is transmitted to users 1107 as one continuous stream. FIG. 11A illustrates an example of the modified content stream 1109 being streamed from the intermediary interactive system (e.g., server) 1103. FIG. 11B illustrates an example of the modified content stream 1109 transmitted back to the publisher 1101 (e.g., in a stream represented as 1111) so as to provide to users through the publisher system (e.g., in a stream represented as 1113).

Referring back to the modification of content at the intermediary interactive system 1103, as the content stream is continuously received from the publisher 1101 and modified to interactive content at appropriate points in the content, the intermediary interactive system 1103 may determine the size of data block (e.g., size of content block 1102) to be analyzed and modified together. For example, in the illustrated example in FIGS. 11A and 11B, the size of data block to be analyzed and modified together is the content block represented by 1102. The next stream of content (not shown) is analyzed and modified in subsequent to the analysis and modification of the previous data block 1102. Optionally, if interactive content is to be added frequently, the size of data block may be relatively small, whereas if interactive content is to be added only sporadically, the size of data block may be relatively large. Optionally, the size of data block may vary depending on the type of data (e.g., smaller size for video data due to heightened complexity needed for analysis and modification of the video data than for the audio only data.) Optionally, the size of data block may vary depending on the network conditions (e.g., network between the publisher 1101 and the intermediary interactive system 1103, network between the publisher 1101 and users 1107, network between the intermediary interactive system 1103 and users 1107.) For example, if a network is experiencing a lag, the intermediary interactive system 1103 analyzes and modifies a smaller size of content stream at a time.

Referring back to the modification of content at the intermediary interactive system 1103, the illustrated examples in FIGS. 11A-11B show that the interactive content 1105 is inserted, e.g., purely added, to the original content 1102 such that no portion of the original content is lost. However, this is only exemplary, and the interactive content may be added to the original content such that it causes loss of at least a part of the original content. For example, the interactive content may be added to replace a certain, designated portion of the original content. In other examples, the interactive content may be added at a first location in the original content while it causes removal of data at a second location in the original content. In still other examples, the original content may include a portion of blank data with markers identifiable by the intermediary interactive system 1103, such that the interactive content is added to overlay that designated portion of blank data.

In some embodiments, the content block 1102 includes markers within the content and/or contains instructions in the metadata specifying where should be the start and end of the interactive content, what type of interactions should be enabled (e.g., voice-interactive content, gesture-interactive content, etc.), how to select appropriate interactive content (e.g., interactive adverting targeting a specific group of users), etc.

In some embodiments, in addition to inserting the interactive content 1105, silent content of a pre-determined length may be inserted following the interactive content. This silent content is used to play in parallel while the voice command capture and speech recognition are occurring so that the content stream does not need to be silenced or paused during the interaction period.

In the direct-insertion approach, as the modified content including both the interactive and non-interactive portions is streamed as one continuous stream from a single source (e.g., from intermediary system 1103 or publisher 1101), the direct insertion approach allows users to experience a smooth switching between playback of interactive content and that of non-interactive content. However, the direct insertion requires the intermediary interactive system 1103 to first capture the raw data from the publisher 1101 and have control and access to directly modify such data to insert the interactive content. This can be considered as too intrusive to some content publishers. Accordingly, a less intrusive approach that does not require direct meddling of raw data may be beneficial. A multi-stream technique, explained below, is one way to achieve such result.

2. Multi-Stream Technique

In some embodiments, the conventional, non-interactive content is provided to users in parallel with interactive content. Thus, no or minimal meddling with the conventional content is required. This approach is referred to as a multi-stream technique.

The multi-stream technique involves two or more separate data streams that can be provided to users. Since the user receives content data from two or more data sources, to ensure that the user receives coherent and consistent data from the multiple data sources, the multiple data sources need to coordinate switch timings (e.g., when to start streaming data to the user, when to stop streaming data to the user, when to cue other data source(s) to start streaming data, etc.) With appropriate coordination, the user may experience as if it is receiving continuous data from a single source, where the data is in fact, a combination of data streamed from multiple sources in parallel. Examples of this technique are shown in FIGS. 12A-12B.

Figure 12A:
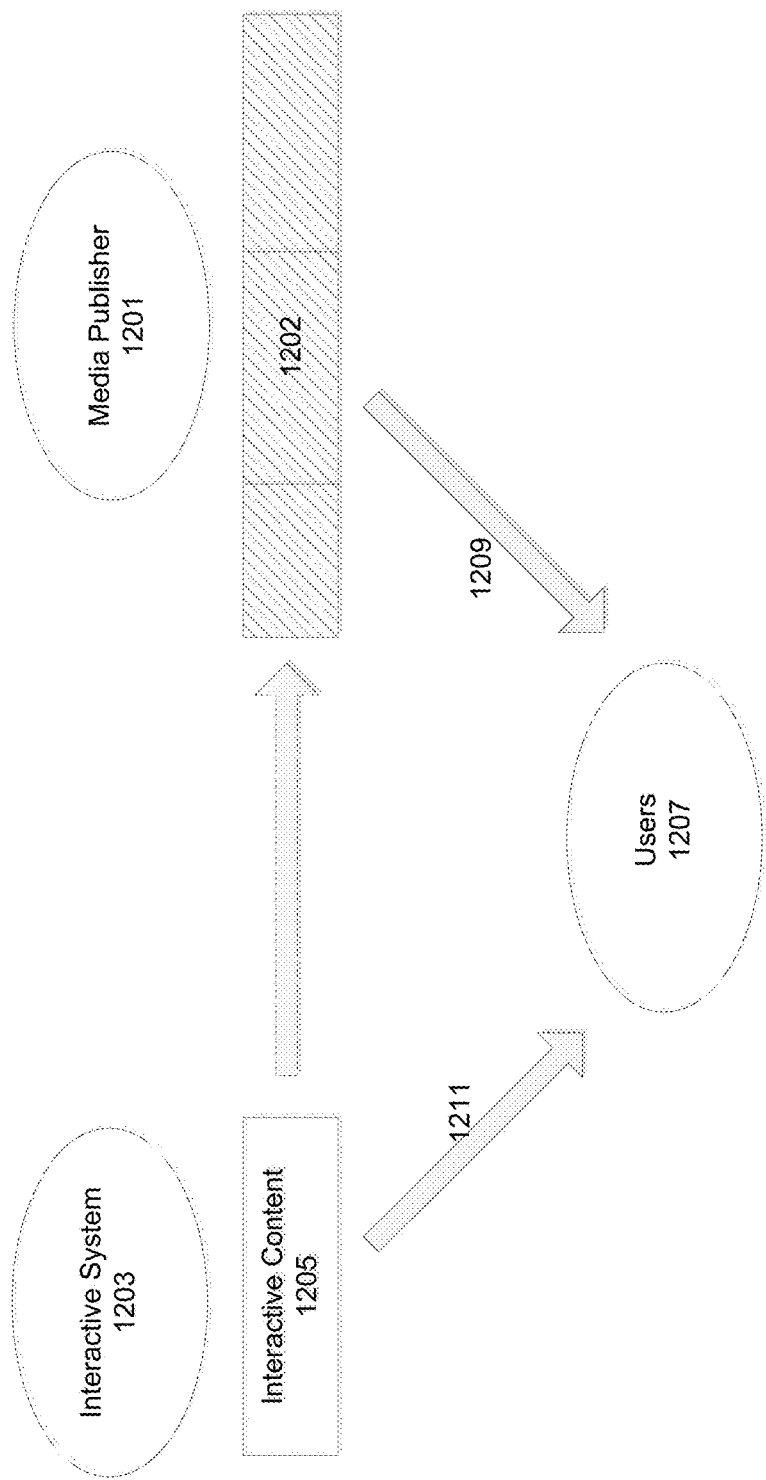
FIG. 12A illustrates an example of the media publisher streaming original content to users.

For example, in FIG. 12A, media publisher 1201 streams original content 1202 directly to users 1207. The original content 1202 does not include interactive content or otherwise have the ability to recognize and respond to user's voice commands or other inputs. While the original content 1202 is being streamed, the interactive system 1203 monitors the content being streamed, and upon detection of predefined events (e.g., recognition of markers embedded in the content stream 1202 or metadata of the content stream 1202), the interactive system 1203 starts playing interactive content 1205 while silencing the original content 1202 (e.g., by muting the original content 1202, pausing the original content 1202, or playing silence in place of the original content 1202). In the illustrated example, the interactive content 1205 is streamed from interactive system 1203 (e.g., in a stream represented as 1211). At the end of playback of the interactive content stream 1205, or at the end of a response operation if a voice command was detected during the playback of the interactive content, the interactive system 1203 un-silences the content stream 1202 (e.g., unmutes, resumes or play non-silence audio or video data).

Figure 12B:
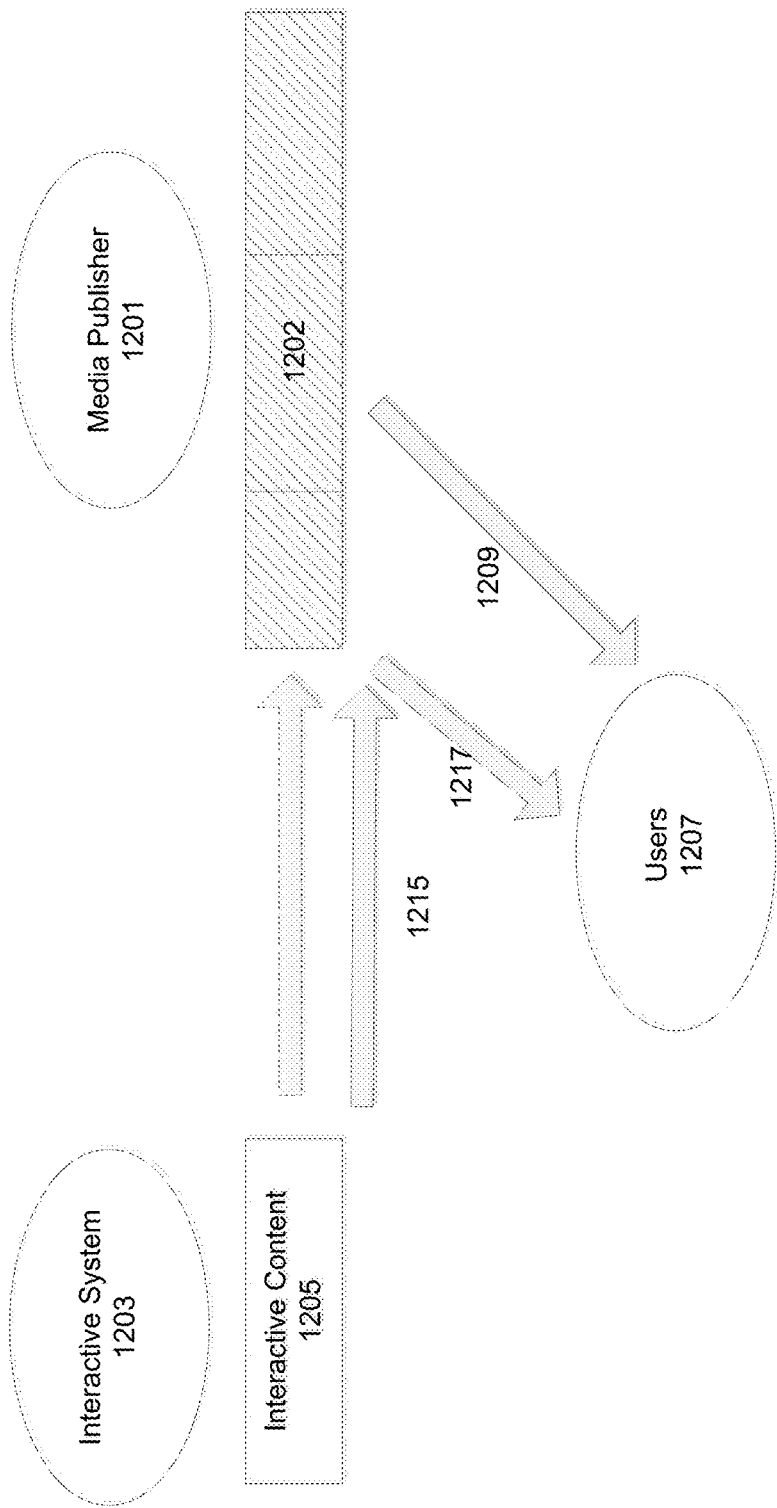
FIG. 12B illustrates an example of the media publisher streaming media content while the interactive system listens in for a predefined event or marker.

In other examples shown in FIG. 12B, the media publisher 1201 streams media content 1209 (usually non-interactive content) to users 1207, while the interactive system 1203 listens in for detection of a predefined event or marker. Upon detection of the predefined event or marker, the interactive system 1203 transmits interactive content 1205 to the media publisher 1201 (e.g., in a stream represented as 1215) so that the interactive content 1205 can be streamed from a playback mechanism of the media publisher's server (e.g., in a stream represented as 1217). The switch between the two content streams 1209 and 1217 may be done by the interactive system 1203, by allowing access to the playback mechanism of the media publisher's server. For example, the interactive system 1203 monitors the content 1209 for predefined events for preparation of the switching, the actual switching between the two content streams 1209 and 1217, the activation and termination of the speech recognition engine, etc.

In some embodiments, the switch timing between the interactive content 1205 and main content 1202 are dictated by one or more predefined events such as, non-exclusively, markers and metadata. The switch timing may be precisely controlled such that users 1207 receiving the content from two or more separate streams may feel as if the content is streamed continuously from a single source. For example, if the switch occurs too fast, content from one stream may overlap with content from other stream, which may result in unintelligible mixed audio or video data. If the switch occurs too late, there could be a gap of silence, which may hinder achieving a pleasant and enjoyable user experience.

Optionally, the media publisher 1201 and the interactive system 1203 may use a single playback mechanism for playing content (e.g., using the playback mechanism of the media publisher 1201.) Optionally, the media publisher 1201 and the interactive system 1203 may use different playback mechanism (e.g., one installed on the server of the media publisher and the other installed on the interactive system server, or both installed on the media publisher, etc.)

Further, in some embodiments, implementation of a technology that allows for a receipt of video content from the media publisher and direct modification of the received content (e.g., adding, inserting, swapping of interactive content) might require a more complex code structure than the implementation of the similar technology for audio content. In this case, the multi-stream technique may enable a relatively easy implementation of the technology for the video content, as it does not require a direct modification of the video content.

Although the examples illustrated in FIGS. 12A-12B involve two separate streams, one stream on main content and another on interactive content, it is noted that there can be multiple streams. For example, one stream may be used to provide the main content, a second stream for first interactive content, a third stream for third interactive content, etc. Each of various modifications and permutations of the illustrated examples are not listed here for brevity and deemed within the scope of the present disclosure.

Briefly, delivering interactive content as a separate stream from the main content may result in various advantages. For example, it can minimize changes and modifications that need to be made directly to the original, main content, which would otherwise be needed to a certain extent to provide with interactive content. However, the multi-stream approach may suffer from a disruption and offset of simulcast content streams (e.g., overlap of audio data due to early switching, or latency issues due to late switching); thus, to optimize the efficiency and overall performance of the multi-stream system, a precise timing control mechanism is desirably implemented as part of the system allowing for a smooth transition from one stream to another stream.

Below described are various ways to control the switch timing in the multi-stream technique—for example, by using one or more predefined events such as network proxies (e.g., sub-audible tones embedded in the main content and/or interactive content) and/or metadata associated with the main content and/or interactive content. Examples of these uses are described in reference to FIGS. 13-18. As will be apparent in the descriptions below, more than one events may be used to control the switch timing.

2.1. Network Proxy Approach

The network proxy approach may utilize various network events that can be detectable by the interactive system 1203 and/or media publisher system 1201. Such network events include, non-exclusively, sub-audible tones embedded in the content streams. For example, a sub-audible tone may be used to signal a time to prepare the switching between content streams, a time to execute an actual switching, a time to put a system (e.g., a speech recognizer engine) on a stand-by mode, a time to put a system on a running mode, a time to put a system on a deactivation mode, a time to revert the switching, a time to hold the content streams for other actions, etc.

In some embodiments, sub-audible tones are embedded in either or both the interactive content and main content. The sub-audible tones are designed so that they are detectable by the device but not detectable by an unaided human ear. Thus, even if the content with embedded sub-audible tones is played on a user's device, the user will not be able to hear or recognize presence of the sub-audible tones.

Figure 13:
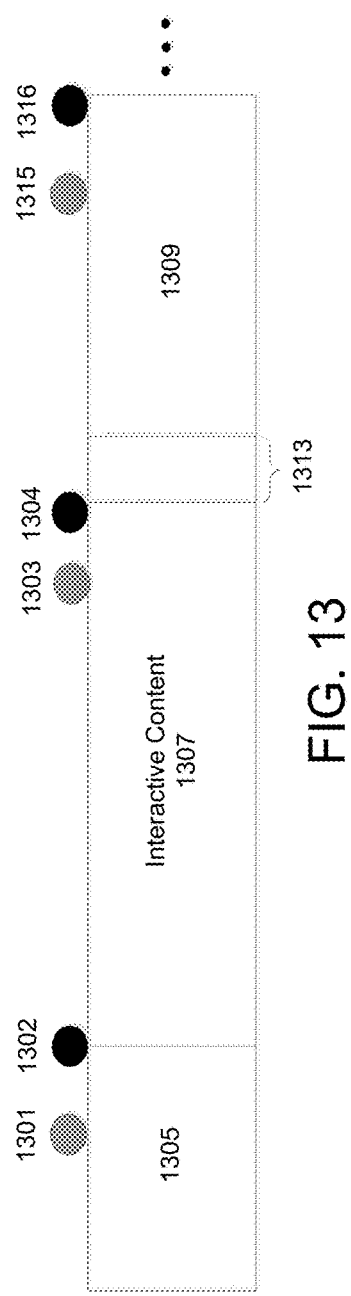
FIG. 13 illustrates an example of content data with one or more markers for interactive content, in accordance with some embodiments described herein.

For example, in FIG. 13, the markers (e.g., sub-audible tones 1301, 1302, 1303, 1304, 1315, 1316) are embedded in the main content 1305, 1309 and interactive content 1307. The media publisher may stream the first main content 1305, as the first main content 1305 is streamed, the interactive system may monitor the streamed content for detection of the predefined events, in this case, the markers. The sub-audible tones 1301, 1302, 1303, 1304, 1315, 1316 may be the same tone or different tones (e.g., different frequencies).

In response to detecting sub-audible tone 1301, the interactive system may initiate preparation of playback of the interactive content 1307. The preparation may entail selecting interactive content 1307 based on various factors (e.g., main content 1305, predefined user preferences, predefined media publisher' preferences, etc.), putting the playback mechanism for the interactive content on a stand-by mode, etc.

In response to detecting sub-audible tone 1302, the interactive system may start playing the interactive content 1307 and silence the main content 1305.

In response to detecting sub-audible tone 1303, the interactive system may initiate preparation of the speech recognition. The preparation of the speech recognition may involve putting the speech recognition engine on a stand-by mode, obtaining command-action correspondence data associated with the interactive content 1307 (e.g., different command-action correspondence data is associated with different interactive content), obtaining an appropriate prompt for the obtained command-action correspondence data (e.g., if action is "call," generate a prompt message saying "to call now, say XXX"; if action is "receive more information," generate a prompt message saying "to receive more information now, say YYY").

In response to detecting sub-audible tone 1304, the interactive system may activate the speech recognition, e.g., turning on the speech recognition engine. This may involve turning on a microphone connected to the user's device, turning on a noise-canceller associated with the microphone or the speech recognition engine on the interactive system side.

In some embodiments, in response to detecting sub-audible tone 1304, the prompt message (e.g., generated prior to detecting sub-audible tone 1304) is played. The message may include a beep or other equivalent cue signal to notify to users that the speech recognizer is turned on after the signal (e.g., "to call now, say XXX after the beep").

In some embodiments, while the speech recognition is activated, the device and the interactive system may recognize and respond to not only voice commands but also other form of inputs such as touch inputs, motion inputs, hand inputs, and other mechanical inputs (e.g., keyboards, buttons, joysticks, etc.)

In some embodiments, the period for which the speech recognition is activated (represented by period 1313 in FIG. 13) corresponds to the predefined length of silence that is played by the playback mechanism of the media publisher or interactive system. Optionally, instead of playing the predefined length of silence for the period of speech activation 1313, the playback of the content may be stopped (e.g., paused, terminated).

In some embodiments, the period for which the speech recognition is activated (represented by period 1313 in FIG. 13) is equal to or greater than a predefined minimum period. The predefined minimum period for activation of the speech recognition is, optionally, 2 seconds, 3 seconds, 4 seconds, 5 second, 6 second, etc.

In some embodiments, the actual period for which the speech recognition is activated (represented by period 1313 in FIG. 13) may vary depending on whether any speech activity has been detected. If any speech activity is detected before the predefined minimum period elapses, the speech recognition is turned on for an additional time period even after the minimum period elapses (e.g., does not cut off the speech recognizer while user is speaking, or prompting to say again if previous command has not been detected with sufficient clarity).

If a voice command is detected, the speech recognition engine determines whether the detected voice command is the predefined action phrase associated a response (e.g., from the command-action correspondence data/table). If the detected voice command corresponds to the predefined action phrase, the interactive system causes the associated action to be performed (e.g., by the user's device or by the server or by any other designated entity). For example, the actions of calling, texting, and emailing to predefined destinations may be performed by the user's device. The actions of sending information for receipt by the user's device, calling the user's device, instructing a third party to contact the user, etc., may be performed by the interactive system. The techniques for recognizing and analyzing voice commands and performing associated actions (e.g., including, but not limited to, activating web browser application, call application, EMAIL application, transmitting different content, etc.) are described in reference to FIGS. 1-10, and are not repeated here for brevity.

Optionally, the main content 1305 and interactive content 1307 may continue to be silenced while the action is executed. In response to detecting completion of the action, the main content 1309 is resumed (e.g., the switching between the main content stream and interactive content stream occurs in multi-stream embodiments), and the speech recognition is turned off.

In some embodiments, if no speech activity is detected until the minimum period of speech recognition elapses, the main content 1309 is immediately resumed, and the speech recognition is turned off.

In some embodiments, silencing the content stream can be achieved in various ways, for example, by muting the content, pausing the content (e.g., and storing the subsequent streams), playing silence over the content, and/or inserting a silent stream of audio of pre-determined length at the end of or after the interactive content 1307 and/or the main content 1305.

Similarly, un-silencing the content stream can be unmuting the content such that it starts playing the content that is being currently streamed, resuming the content such that it starts playing from where it has left off (e.g., pulling the content streams from the local storage), or terminating the playback of silence over the content. Optionally, the interactive system may require a user confirmation to continue muting main content streams (1305, 1309) and/or to resume playback of such streams. After the main content 1309 is resumed, the interactive system repeats the monitoring and triggering necessary actions in response to detection of the markers, e.g., 1315 and 1316, to switch to the stream of the same or different interactive content.

There are various device components that can be used to implement the network proxy-based interactive system, including, for example, a stream player, a stream server, a stream proxy, a stream monitor, and interactivity SDK. A stream player is designed by application developers to enable playback of streaming content onto one or more devices (e.g., smartphones, vehicles, TVs, tables, etc.) In some embodiments, it is advantageous to use a stream player that requires minimal modification and customization for ease of distribution and use by end users.

In some embodiments, a stream server hosts a stream of audio or video data being streamed and played by the stream player. The markers (e.g., sub-audible tones) may be inserted into the content stream by the stream server. Optionally, the markers may be inserted by an intermediary server (e.g., interactivity server) that captures the streaming content from the stream server (the host server) to insert the markers and transmit the modified content to the end users.

In some embodiments, a stream proxy intercepts network calls to the remote stream to capture the actual bytes. The stream proxy may interact with the stream player to handle URL requests and fulfill the requests while simultaneously saving the processing time and power of the stream monitor. The stream proxy may be configured as an integral component of the stream player.

In some embodiments, the interactive SDK operates in a manner similar to how it normally operates in response to the interactive content that is directly inserted into the stream before the user receives the content, with the following optional differences—the interactive SDK in the multi-stream embodiment may play the original base content while muting the original base content as alternative interactive content is being played; and, if no user response is detected during the speech recognition state, the interactive SDK may un-silence the original base content to play the trailing audio in response to reaching the end of the time period reserved for the recognition.

In some embodiments, a stream monitor analyzes the data produced by the stream proxy to identify the markers. The markers may identify at least two points: 1) when the interactive content (e.g., advertisement) should start playing; and 2) when the recognition state should start (e.g., turning on the microphone, etc., for recognizing user responses.)

Figure 14:
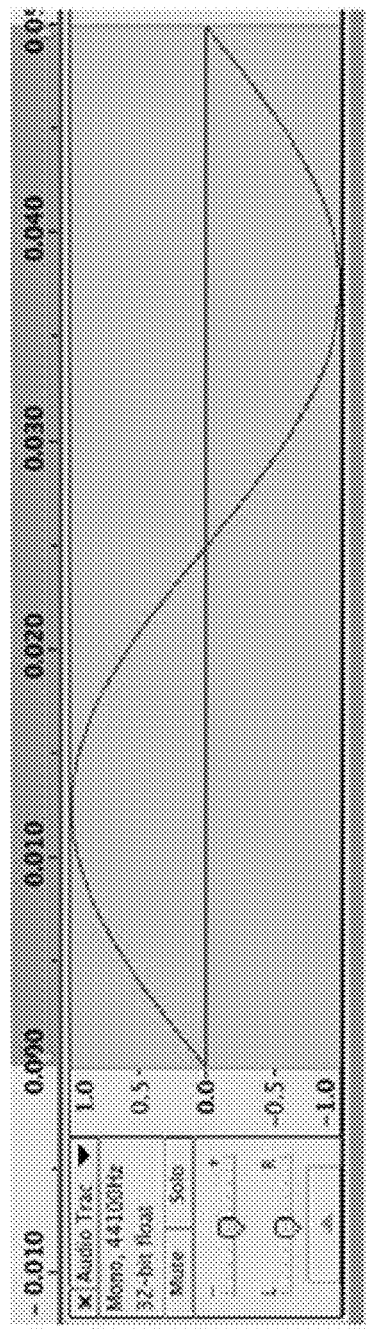
FIG. 14 illustrates an example of a sub-audible tone marker.

In some embodiments, the marker is a sub-audible tone, which is a distinct audio wave at 20 hertz or less (e.g., 18 hertz, 16 hertz, 14 hertz, 12 hertz, 10 hertz, etc.) is inserted into the stream at a low amplitude. The wave is not detectable to the human ear but may be recognized by the stream monitor programmatically. An example of the sub-audible wave is shown in FIG. 14. In this example, the duration of the wave is approximately 50 milliseconds that correspond to about 20 hertz. This wave, however, does not produce any sound detectable by an unaided human ear.

In addition to sub-audible tones or other similar markers that are embedded at various points in the content stream to signal actions, metadata associated with the content streams may be used to notify the various timings and provide switch instructions. Described below are various examples of using metadata of the interactive content and/or main content to perform the similar switching actions.

2.2 Metadata Approach

The switch timing information may be identified in the metadata of the content stream in place of, or in conjunction with, the sub-audible tones embedded in the content stream. For example, the metadata of the main content 1305 may comprise information indicating the points or times represented by the sub-audible tones 1301 and 1302. Such metadata may be streamed at the beginning of the content stream 1305, in the middle of the content stream 1305 (before the point represented by the sub-audible tone 1301), or in a separately stream from the content stream 1305.

Similarly, the metadata of the interactive content 1307 may comprise information indicating the points or times represented by the sub-audible tones 1303 and 1304. Such metadata may be streamed at the beginning of the content stream 1307, in the middle of the content stream 1307 (before the point represented by the sub-audible tone 1303), or in a separately stream from the content stream 1307.

The metadata can be provided in the form of ID3 or HLS to indicate where precisely the recognition state should start. This approach may, however, involve working with the stream creator to modify the metadata in order to ensure that the marker metadata is properly inserted.

As described in the examples above, the marker to trigger the start of the interactive content playback is placed at the beginning of associated content. The beginning of the associated content may be identified by the presence of metadata in the stream. The metadata can be in the form of an ID3 tag, or in the case of an HTTP Live Stream, the metadata can be in the form of M3U8 playlist file.

An example of M3U8 playlist is shown below:
EXTM3U
EXT-X-ALLOW-CACHE:NO
EXT-X-TARGETDURATION:11
EXT-X-MEDIA-SEQUENCE:3
EXTINF:10,title="The Heart Wants What It Wants", artist="Selena Gomez" length=¥"00:03:40¥"
http://streaming.xappmedia.com/1469/Gq186Xy4o17-15395-10031.aac As noted above, the metadata may be used to control the precise timing of the stream switching in lieu of, or in addition to, the proxies. For example, the metadata designates at which point in time or within the content the interactive content should start and the original content should be muted, as well as the time point at which the device should enter the recognition state (e.g., turning on the microphone.) The metadata approach may involve a simpler implementation than the proxy-based approach, because it does not need to insert proxy events or monitor content for proxy events. However, the metadata approach may require obtaining access to modify the metadata of the original content produced by the original content publishers.

The metadata approach may be implemented using a stream player, a stream server, and a metadata listener. A stream player may be designed by application developers to enable playback of streaming content onto one or more devices (e.g., smartphones, vehicles, TVs, tables, etc.) In some embodiments, it is advantageous to use a stream player that requires minimal modification and customization for ease of distribution and use by end users.

In some embodiments, a stream server hosts a stream of audio or video data being streamed and played by the stream player. The stream server in the metadata approach may supply a content stream with precisely timed metadata, so that the metadata alone can be used to identify the timings at which the various actions (e.g., switching to a different stream of content, activation of speech recognition state, etc.) should be triggered.

In some embodiments, a metadata listener analyzes the metadata in the streamed content and looks for the following two optional points in the stream: 1) the start of the interactive content, 2) and the start of the recognition state (e.g., initiate speech recognition state.) Upon identifying the precise timings of those points, the device activates the associated actions at the identified times without the need for a separate marker or proxy event.

In the embodiments of the proxy-based and metadata-based approaches, the publisher server, optionally, includes the following components: media source, interactive-content injection server, and interactive creation server. The media source is the origin of the streaming content. For live audios, the media source is an audio capture device. The interactive system server silences the original content (e.g., regular, non-interactive ad) and plays the interactive content (e.g., interactive advertisements or interactive content that can recognize and respond to users' real-time inputs.) The interactive content is optionally, digital-only content, audio and/or video content, or targeted content selected based on an algorithm considering a number of characteristics associated with the user, device and content, as described at least in reference to FIG. 6.

Figure 15A:
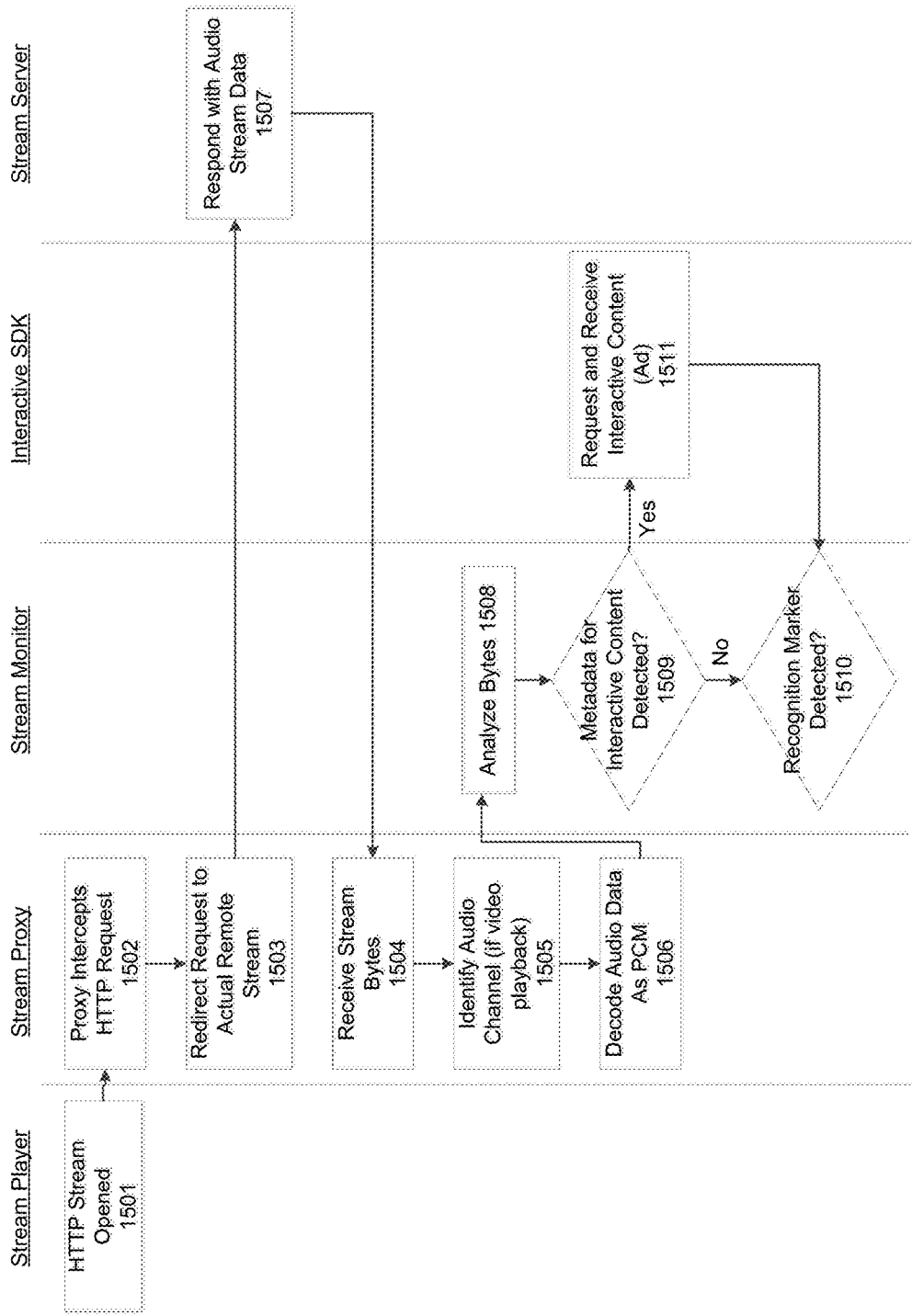
FIG. 15A and FIG. 15B illustrate an exemplary process for providing speech interactive content based on an event such as recognition of a marker.
Figure 15B:
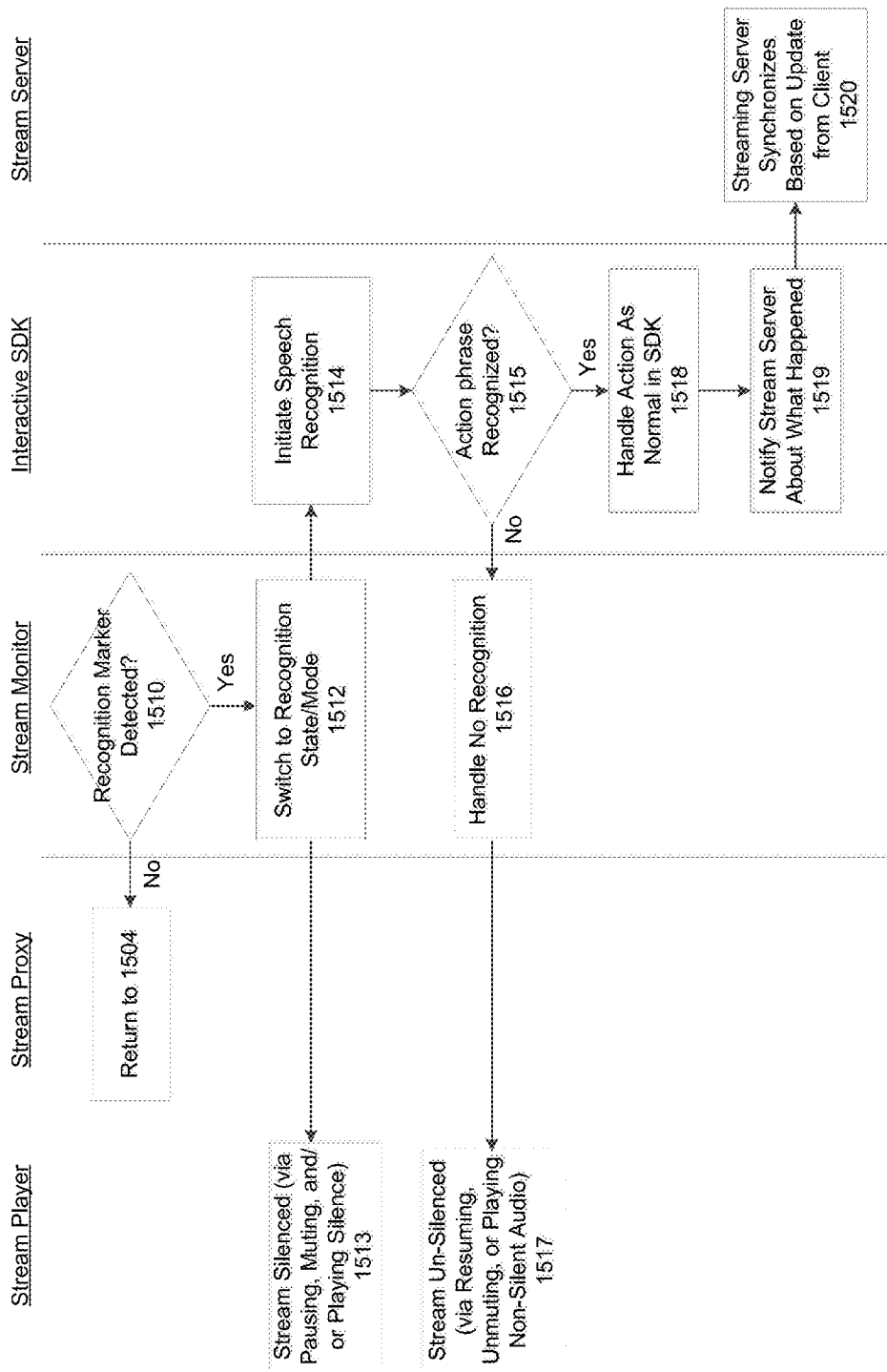

FIGS. 15A and 15B illustrate an exemplary process flow for an event-based player based on network proxies. In FIG. 15A, the proxy-based system includes a stream player, a stream proxy, a stream monitor, an interactive SDK, and a stream server. At 1501, a stream player opens HTTP stream, which is intercepted by the stream proxy. At 1502, the proxy intercepts the HTTP request, and redirects the request to the actual remote stream to the stream server, at 1503. The stream server that is the origin of the media stream responds with audio stream data, at 1507, and the stream proxy receives the stream bytes, at 1504. If video playback is used, the proxy identifies the audio channel, at 1505, and decodes the audio data as PCM, at 1506. The audio data is then analyzed by the stream monitor, at 1508. Based on the analyzed data, the monitor determines whether metadata for interactive content exists, at 1509. If such metadata exists, the SDK requests for and receives the interactive content, at 1511. With the interactive content received, the monitor determines whether a recognition marker is detected in the received stream (e.g., the interactive content stream requested and received by the SDK), at 1510.

Continuing to FIG. 15B, if the recognition marker is not detected, the process returns to block 1504 to further receive the stream bytes from the streaming content from the stream server. If the recognition marker is detected, the monitor switches to the recognition state, at 1512. The switch to the recognition state entails silencing the original content stream, at 1513, via pausing, muting, and/or playing silence (e.g., playing a predetermined length of silence). As explained above, the predetermined length of silence may be played following the interactive content. The silence may be played for a minimum length, and the actual length for which the silence is played may be adjusted fluidly based on detection of speech activity, etc.

The switch to the recognition state also initiates the speech recognition, at 1514. While the speech recognition is activated, the SDK determines whether an action phrase has been spoken by the user, at 1515. If no response, the monitor handles no recognition at 1516, by resuming the content. For example, the stream player un-silences the previously silenced content, at 1517, via resuming, unmuting, and/or playing non-silent audio data. If an action phrase is detected, the SDK handles the action, at 1518, for example, as described in reference to FIGS. 1-10. After the requested action phrase has been acted upon by the system, the SDK so notifies the stream server, at 1519. The stream server then proceeds to synchronize the streaming content based on the updates received from the SDK, at 1520.

Figure 16A:
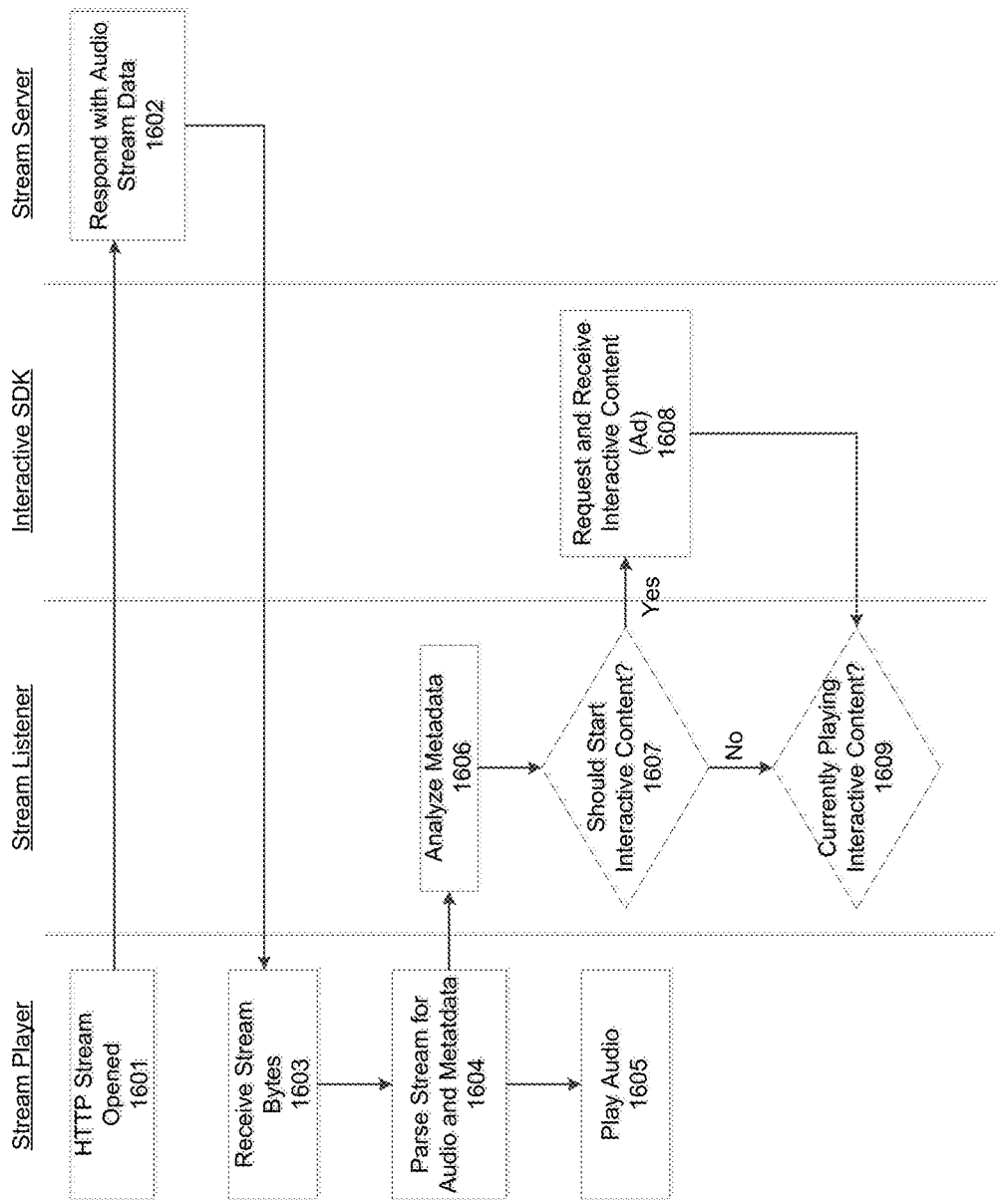
FIG. 16A and FIG. 16B illustrate an exemplary process for providing speech interactive content based on information embedded in metadata of the content.
Figure 16B:
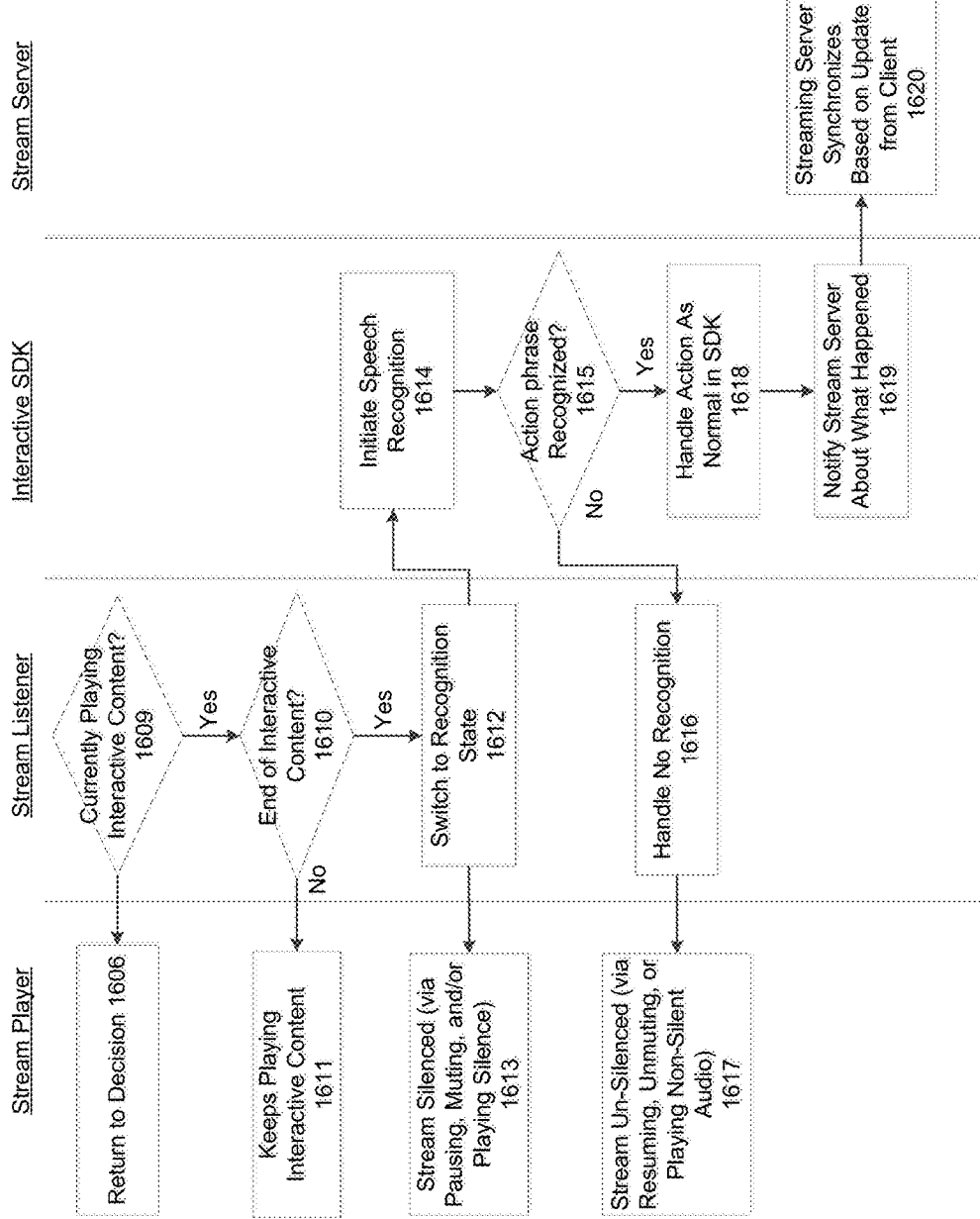

FIGS. 16A and 16B illustrate an exemplary processing flow for an event-based player based on metadata. In FIG. 16A, the metadata-based system includes a stream player, a stream listener, an interactive SDK, and a stream server. At 1601, the stream player opens the HTTP stream, which is responded by the stream server with audio stream data, at 1602. After receiving the audio steam data from the stream server, at 1603, the stream player parses the received stream for audio and metadata, at 1604. The parsed audio data is played by the stream player, at 1605, and the parsed metadata is analyzed by the stream listener, at 1606. Based on the analyzed metadata, the stream listener determines when the interactive content should start playing and decides whether it is time to start playing new interactive content, at 1607. In some embodiments, this decision is made before the designated start time of the interactive content to allow sufficient time for the system to obtain the appropriate interactive content (e.g., the interactive content targeted based on user characteristics, etc.) and be prepared for the play.

If the stream listener decides that it is time to start playing the interactive content, the interactive SDK requests for and receives appropriate interactive content to be played, at 1608. Otherwise, if the stream listener decides that it is not time to start playing new interactive content, the stream listener further decides whether previous interactive content is being currently played, at 1609. Note that the start time for playing new interactive content and the end time for a respective interactive content are identified in the respective metadata of the stream that is analyzed before making these decisions.

Continuing to FIG. 16B, if the stream listener decides that no interactive content is currently being played, the stream listener waits to receive the next stream bytes and returns to block 1606 to analyze the metadata of the next stream. Otherwise, if the stream listener decides that interactive content is currently being played, the listener decides whether it is the end of the currently-played interactive content, at 1610. If not, the stream player keeps playing the interactive content, at 1611, until it reaches the end of the interactive content. If the stream listener decides that it is the end of the interactive content, the stream listener initiates the recognition state, at 1612. As the system enters the recognition state, the stream player silences the stream via pausing, muting, and/or playing silence (e.g., playing a predetermined length of silence), at 1613, and the interactive SDK activates the speech recognition system, at 1614. As explained above, the predetermined length of silence may be played following the interactive content. The silence may be played for a minimum length, and the actual length for which the silence is played may be adjusted fluidly based on detection of speech activity, etc.

Once the speech recognition system is activated, the SDK determines whether any action phrase is spoken by the user, at 1615. If no action phrase is spoken, the stream listener handles the no-response event, at 1616, by making the stream player un-silence the previously-silenced audio stream via resuming, unmuting, and/or playing non-silence audio. If an action phrase is spoken by the user and so recognized, the SDK handles the requested action, at 1618, for example, as described in reference to FIGS. 1-10. After the requested action phrase has been acted upon by the system, the SDK so notifies the stream server, at 1619. The stream server then proceeds to synchronize the streaming content based on the updates received from the SDK, at 1620.

Figure 19:
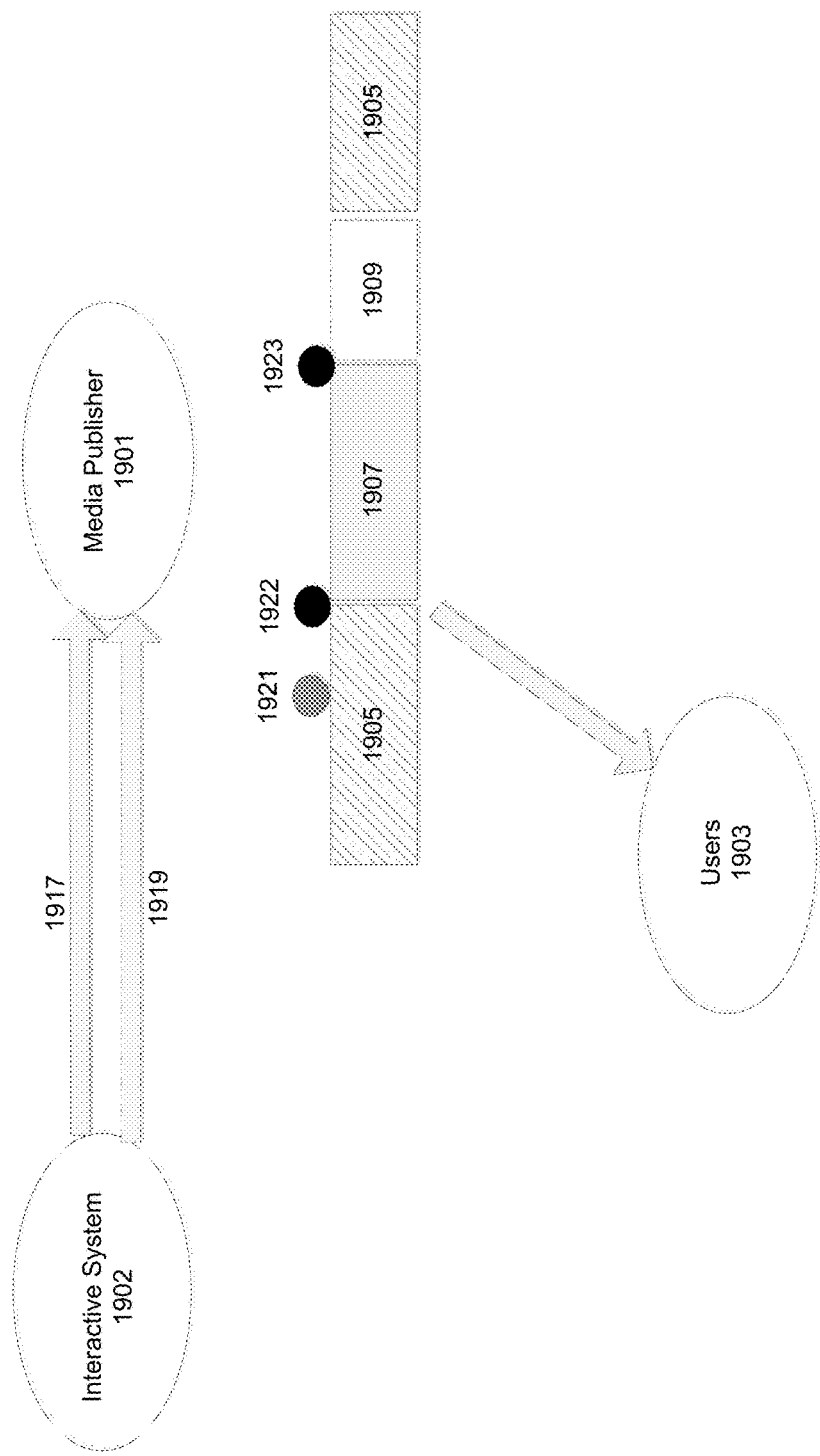
FIG. 19 illustrates an example of the interactive server monitoring the main media content provided from a remote content provider.

Although the switching mechanisms are explained above in reference to the multi-stream technique (where main media content and interactive content are provided from different playback devices, e.g., one from remote content provider and the other from an interactive server), the switching mechanisms may equally be applicable to the direct insertion technique. For example as shown in FIG. 19, the interactive server (e.g., interactive system 1902 in FIG. 19) monitors the main media content (e.g., content 1905) provided from a remote content provider (e.g., media publisher 1901). Upon detection of a first event (e.g., detection of sub-audible tone 1921 and/or metadata associated with media content 1905), the interactive server provides speech interactive content (e.g., which is selected prior to, or during, playback of the main media content).

A supply of the selected speech interactive content (e.g., speech interactive content 1907) is exemplarily represented in transmission stream 1917 in FIG. 19. Once the speech interactive content is selected, it may be directly injected into the stream of the main media content. The injection process may be executed by the media publisher 1901 (e.g., through programs pre-supplied by the interactive system to be compatible with the transmission mechanisms between the interactive system 1902 and media publisher 1901). For example, the interactive system 1902 may transmit the selected speech interactive content 1907 to the media publisher 1901, and the media publisher 1901 modifies the main media content 1905 to add the received speech interactive content 1907.

In other cases, the injection process may be executed by the interactive system 1902. For example, the media publisher 1901 may transmit the main media content 1905 such that the interactive system 1902 modifies the main media content to add the selected speech interactive content 1907 at appropriate place(s) and then transmit back the modified content to the media publisher 1901 so that it can be played to the users 1903.

The first event (e.g., sub-audible tone 1921 and/or metadata associated with media content 1905) indicating a time for preparation of the playback of speech interactive content may occur a few seconds (e.g., or a few minutes) earlier than a second event (e.g., detection of a sub-audible tone 1922 and/or metadata associated with media content 1905) indicating a time to actually begin playback of the speech interactive content. Upon detection of the second event, the speech interactive content 1907 is played to the users 1903 from the playback device of the media publisher 1901, while the main media content 1905 is silenced. In often cases, the playback device of the media publisher 1901 that plays the speech interactive content 1907 also plays the main media content 1905. In other cases, the media publisher 1901 may have separate playback devices for playing the main media content 1905 and the speech interactive content 1907.

Upon detection of a third event (e.g., detection of a sub-audible tone 1923 and/or metadata associated with the speech interactive content 1907), a speech recognizer and a microphone are turned on (e.g., for a predetermined minimum period of time) for detecting and recognizing the user's spoken commands. While the speech recognizer is turned on, the main media content continues to be silenced. At the time indicated by the third event, a predetermined length of silence (e.g., block of silence 1909) may be played following the playback of the speech interactive content 1907. In some cases, the predetermined length of silence may be provided by the interactive system 1902 so that it's played by the media publisher 1901, as shown in the transmission stream 1919 in FIG. 19.

Upon detection of a fourth event (e.g., completion of an action responding to user's spoken command or failure to detect user's spoken command for a predetermined maximum period of time, the speech recognizer is turned off, and the main media content 1905 is unsilenced so that its playback is resumed. As such, the switching mechanisms (e.g., silencing one content while playing the other content upon detection of relevant events) described above in reference to the embodiments utilizing the multi-stream technique (e.g., where the main media content and the speech interactive content are played to the users 1903 by two separate players, e.g., players on the interactive system and on the media publisher) are applicable to the embodiments utilizing the direct insertion technique (e.g., where the main media content and the speech interactive content are played to the users 1903 by a single player, e.g., player on the media publisher).

Figure 17:
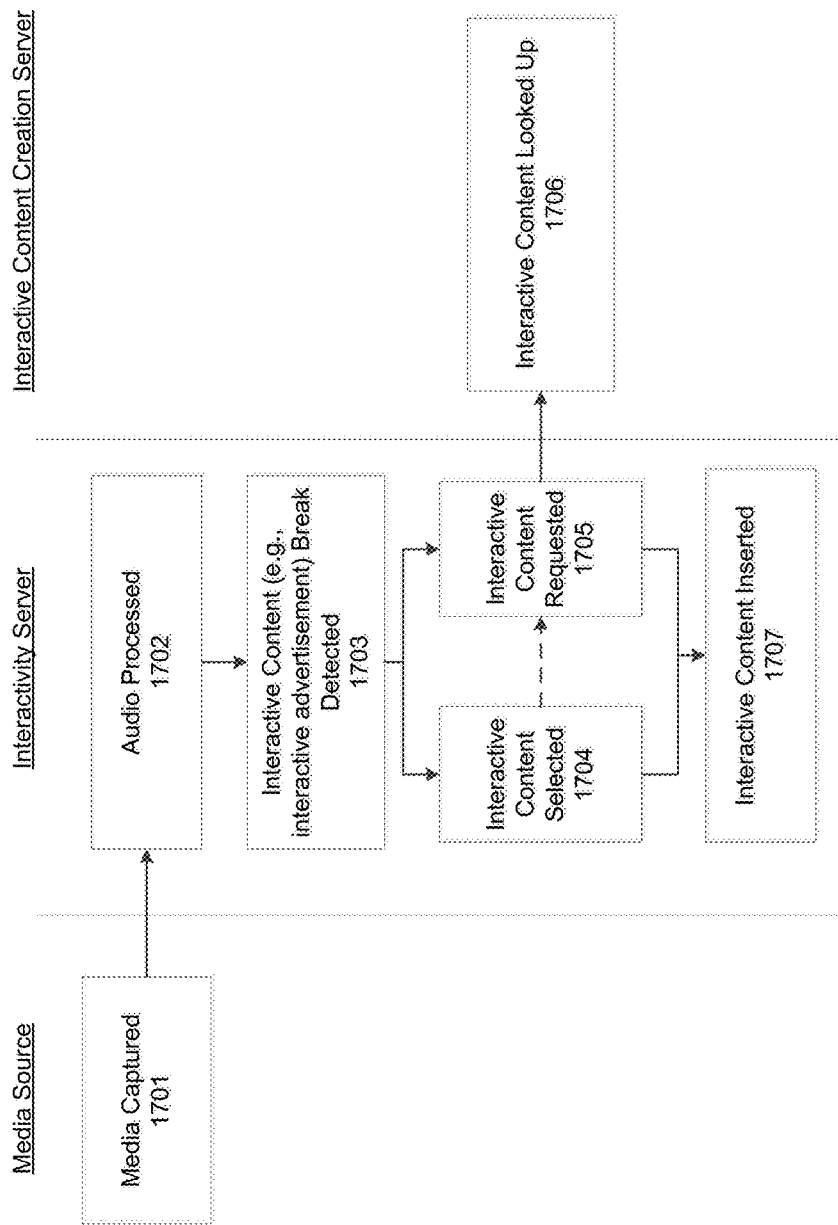
FIG. 17 illustrates an exemplary process for selecting interactive content before playback.

FIG. 17 illustrates an exemplary process for selecting interactive content before playback. At 1701, media is captured at a media source. At 1702, audio is pared and analysed by interactivity server. At 1703, a marker indicating a break for the playback of interactive content (e.g., interactive ad-content or non-ad content) is detected by the interactivity server. At 1704, the interactivity server selects the interactive content, if the desired interactive content is already accessible in a local storage. If not, the interactivity server requests for the interactive content, at 1705. The interactive-content creation server responds to the request, at 1706, according to a selection algorithm associated with the request. For example, the interactive ad content is selected based on user characteristics targeting specific groups of users for certain types of advertised products or services, as described at least in reference to FIG. 6 above. Once the interactive content is selected or pulled from the content creation server, it is loaded for playback, at 1707. As described above, the loaded interactive content can be directly inserted to the original content using a direction insertion technique, or can be streamed in parallel to the original content using a multi-stream technique.

Figure 18:
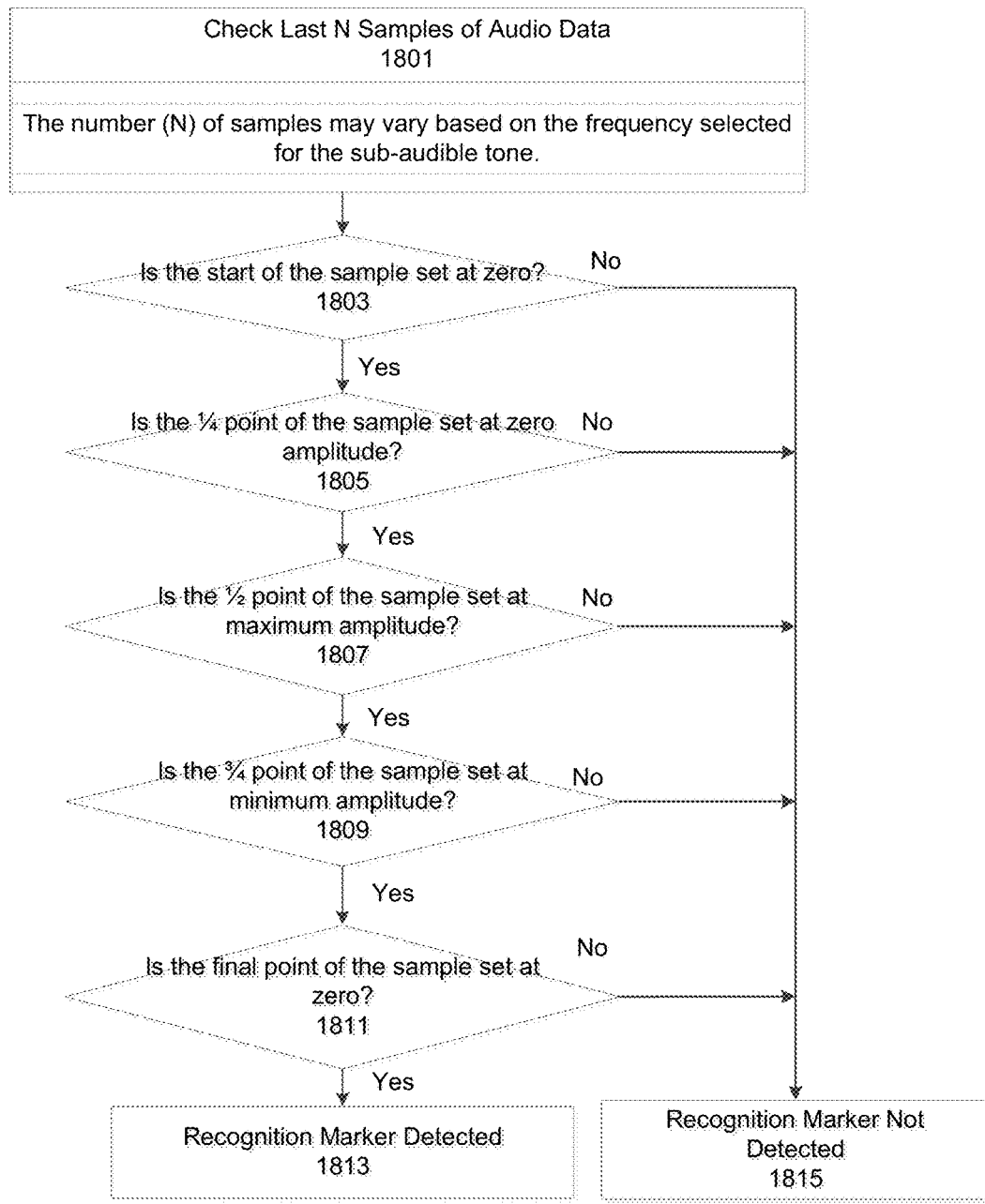
FIG. 18 illustrates an exemplary process for detecting a recognition marker (e.g., a sub-audible tone).

FIG. 18 illustrates an exemplary process for detecting a recognition marker (e.g., a sub-audible tone.) At 1801, the last N number of samples of audio data is checked. The number of samples that are checked can vary based on the frequency selected for the sub-audible tone. For example, if the sub-audible tone is selected to be 20 Hz, the device checks 50 milliseconds of audio data. If the sub-audible tone is selected to be lower, more number of samples is checked. Conversely, if the sub-audible tone is selected to be higher, fewer number of samples is checked. At 1803, the device determines whether the start of the sample is set at zero. The device optionally avoids using a Fast-Fourier Transform on the wave to save processing power. Instead, the device carries on the check processing only on the key points on the audio wave, as shown in the next steps.

If the device determines that the start of the sample is not set at a zero amplitude, the recognition marker is considered not detected, as shown at 1815. If the device determines that the start of the sample is set at a zero amplitude, it progresses to the next determination, at 1805, whether the one fourth point of the sample is set at a maximum amplitude. If not, the recognition marker is not detected. If the one fourth point of the sample is set at a maximum amplitude, the device progresses to the next determination, at 1807, whether the one half point of the sample is set at a zero amplitude. If not, the recognition marker is not detected. If the one half point of the sample is set at a zero amplitude, it progresses to the next determination, at 1809, whether the three fourth point of the sample is set at a minimum amplitude. If not, the recognition marker is not detected. If the three fourth point of the sample is set at a minimum amplitude, it progresses to the next determination, at 1811, whether the final point of the sample is set at a zero amplitude again. If not, the recognition marker is not detected. If the final point of the sample is set at a zero amplitude, the device registers that the recognition marker has been detected.

It should be understood that the particular order in which the operations have been described above is merely exemplary and is not intended to indicate that the described order is the only order in which the operations could be performed. One of ordinary skill in the art would recognize various ways to reorder the operations described herein.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed:

1. A device comprising:
    one or more processors;
    a memory storing one or more computer programs that include computer instructions, which when executed by the one or more processors, cause the device to:
        monitor media content streamed from a content provider to a user, the media content comprising both non-interactive content and interactive content in at least an audio or video format;
        detect a first event in the media content streamed to the user, the first event comprising information associated with activating a speech recognizer to detect voice commands spoken by the user;
        in response to detecting the first event in the media content streamed to the user, activate the speech recognizer;
        while the speech recognizer is activated, receive a voice command spoken by the user and detected by the speech recognizer;
        in accordance with a determination that the voice command spoken by the user is an action phrase, cause an action associated with the action phrase to be performed; and
        in accordance with a determination that the voice command spoken by the user is not the action phrase, cause the media content to continue to be played.

2. The device of claim 1, wherein the first event in the media content is in the form of metadata.

3. The device of claim 2, wherein the first event in the media content is in the form of at least ID3 metadata or HLS metadata.

4. The device of claim 1, wherein the first event in the media content is a sub-audible tone embedded in the media content, wherein the sub-audible tone is not detectable by an unaided human ear.

5. The device of claim 4, wherein the sub-audible tone has a frequency of 20 Hertz or less.

6. The device of claim 1, wherein the media content is associated with metadata comprising instructions for performing the action according to the action phrase, and the metadata is either supplied from the content provider along with the media content or supplied separately from an external source.

7. The device of claim 1, wherein the media content is silenced during a period for which the speech recognizer is activated, and the media content is silenced by at least one of:
    muting a playback mechanism used to play the media content,
    pausing the playback mechanism used to play the media content, or
    playing silence over the playback mechanism used to play the media content.

8. The device of claim 1, wherein the content provider is at least one of a remote media server, a local file system, and a local memory.

9. The device of claim 1, wherein the computer instructions, which when executed by the one or more processors, further cause the device to:
    prior to activating the speech recognizer, cause the interactive content to be played followed by a prompt, the prompt comprising a message instructing the user to say the action phrase, wherein the first event is associated with an end of the prompt such that the speech recognizer is activated after causing the prompt to be played.

10. A method for providing speech interactive content, the method comprising:
    monitoring media content streamed from a content provider to a user, the media content comprising both non-interactive content and interactive content in at least an audio or video format;
    detecting a first event in the media content streamed to the user, the first event comprising information associated with activating a speech recognizer to detect voice commands spoken by the user;
    in response to detecting the first event in the media content streamed to the user, activating the speech recognizer;
    while the speech recognizer is activated, receive a voice command spoken by the user and detected by the speech recognizer;

43 in accordance with a determination that the voice command spoken by the user is an action phrase, cause an action associated with the action phrase to be performed; and in accordance with a determination that the voice command spoken by the user is not the action phrase, causing the media content to continue to be played.

11. The method of claim 10, wherein the first event in the media content is in the form of metadata.

12. The method of claim 11, wherein the first event in the media content is in the form of at least ID3 metadata or HLS metadata.

13. The method of claim 10, wherein the first event in the media content is a sub-audible tone embedded in the media content, wherein the sub-audible tone is not detectable by an unaided human ear.

14. The method of claim 13, wherein the sub-audible tone has a frequency of 20 Hertz or less.

15. The method of claim 10, wherein the media content is associated with metadata comprising instructions for performing the action according to the action phrase, and the metadata is either supplied from the content provider along with the media content or supplied separately from an external source.

16. The method of claim 10, wherein the media content is silenced during a period for which the speech recognizer is activated, and the media content is silenced by at least one of:
muting a playback mechanism used to play the media content,
pausing the playback mechanism used to play the media content, or
playing silence over the playback mechanism used to play the media content.

17. The method of claim 10, wherein the content provider is at least one of a remote media server, a local file system, and a local memory.

18. The method of claim 10, further comprising:
prior to activating the speech recognizer, cause the interactive content to be played followed by a prompt, the prompt comprising a message instructing the user to say the action phrase, wherein the first event is associated with an end of the prompt such that the speech recognizer is activated after causing the prompt to be played.

19. A non-transitory computer readable medium comprising one or more computer programs, which when executed by a device with one or more processors, cause the device to:
monitor media content streamed from a content provider to a user, the media content comprising both non-interactive content and interactive content in at least an audio or video format;
detect a first event in the media content streamed to the user, the first event comprising information associated with activating a speech recognizer to detect voice commands spoken by the user;
in response to detecting the first event in the media content streamed to the user, activate the speech recognizer;
while the speech recognizer is activated, receive a voice command spoken by the user and detected by the speech recognizer;
in accordance with a determination that the voice command spoken by the user is an action phrase, cause an action associated with the action phrase to be performed; and

44 in accordance with a determination that the voice command spoken by the user is not the action phrase, cause the media content to continue to be played.

20. The medium of claim 19, wherein the media content is silenced during a period for which the speech recognizer is activated, and the media content is silenced by at least one of:
muting a playback mechanism used to play the media content,
pausing the playback mechanism used to play the media content, or
playing silence over the playback mechanism used to play the media content.

21. A device comprising:
one or more processors;
a memory storing one or more computer programs that include computer instructions, which when executed by the one or more processors, cause the device to:
monitor non-interactive media content in at least an audio or video format that is streamed from a first source to a user;
detect a first event in the non-interactive media content streamed to the user, the first event indicating a start time of a playback of interactive media content and comprising information associated with activating a speech recognizer to detect voice commands spoken by the user;
in response to detecting the first event in the non-interactive media content streamed to the user:
cause the interactive media content in at least an audio or video format to be played by a second source to the user at the indicated start time, and activate the speech recognizer;
while the speech recognizer is activated, receive a voice command spoken by the user and detected by the speech recognizer;
in accordance with a determination that the voice command spoken by the user is an action phrase associated with the interactive media content, cause an action associated with the action phrase to be performed; and
in accordance with a determination that the voice command spoken by the user is not the action phrase associated with the interactive media content, cause the non-interactive media content to continue to be played.

22. The device of claim 21, wherein the first event in the non-interactive media content is in the form of metadata.

23. The device of claim 22, wherein the first event in the non-interactive media content is in the form of at least ID3 metadata or HLS metadata.

24. The device of claim 21, wherein the first event in the non-interactive media content is a sub-audible tone embedded in the media content, wherein the sub-audible tone is not detectable by an unaided human ear.

25. The device of claim 24, wherein the sub-audible tone has a frequency of 20 Hertz or less.

26. The device of claim 21, wherein the first event is associated with metadata comprising instructions for selecting the interactive media content and the associated action phrase, and the metadata is either supplied from the first source along with the non-interactive media content or supplied separately from an external source.

27. The device of claim 21, wherein the non-interactive media content is silenced during at least a period for which the speech recognizer is activated, and the non-interactive media content is silenced by at least one of:

muting a first playback mechanism of the first source used to play the non-interactive media content, pausing the first playback mechanism of the first source used to play the non-interactive media content, or playing silence over the first playback mechanism of the first source used to play the non-interactive media content.

28. The device of claim 21, wherein the interactive media content is silenced during at least a period for which the speech recognizer is activated, and the interactive media content is silenced by at least one of:

muting a second playback mechanism of the second source used to play the interactive media content, pausing the second playback mechanism of the second source used to play the interactive media content, or playing silence over the second playback mechanism of the second source used to play the interactive media content.

29. The device of claim 21, wherein the first source and the second source are each at least one of a remote media server, a local file system, and a local memory.

30. The device of claim 21, wherein the computer instructions, which when executed by the one or more processors, further cause the device to:

prior to activating the speech recognizer, cause the interactive media content to be played followed by a prompt, the prompt comprising a message instructing the user to say the action phrase, wherein the second event is associated with an end of the prompt such that the speech recognizer is activated after causing the prompt to be played.

31. A method for providing speech interactive content, the method comprising:

monitoring non-interactive media content in at least an audio or video format that is streamed from a first source to a user;

detecting a first event in the non-interactive media content streamed to the user, the first event indicating a start time of a playback of interactive media content and comprising information associated with activating a speech recognizer to detect voice commands spoken by the user;

in response to detecting the first event in the non-interactive media content streamed to the user:

causing the interactive media content in at least an audio or video format to be played by a second source to the user at the indicated start time, and activating the speech recognizer;

while the speech recognizer is activated, receiving a voice command spoken by the user and detected by the speech recognizer;

in accordance with a determination that the voice command spoken by the user is an action phrase associated with the interactive media content, cause an action associated with the action phrase to be performed; and in accordance with a determination that the voice command spoken by the user is not the action phrase associated with the interactive media content, cause the non-interactive media content to continue to be played.

32. The method of claim 31, wherein the first event in the non-interactive media content is in the form of metadata.

33. The method of claim 32, wherein the first event in the non-interactive media content is in the form of at least ID3 metadata or HLS metadata.

34. The method of claim 31, wherein the first event in the non-interactive media content is a sub-audible tone embedded in the media content, wherein the sub-audible tone is not detectable by an unaided human ear.

35. The method of claim 34, wherein the sub-audible tone has a frequency of 20 Hertz or less.

36. The method of claim 31, wherein the first event is associated with metadata comprising instructions for selecting the interactive media content and the associated action phrase, and the metadata is either supplied from the first source along with the non-interactive media content or supplied separately from an external source.

37. The method of claim 31, wherein the non-interactive media content is silenced during at least a period for which the speech recognizer is activated, and the non-interactive media content is silenced by at least one of:

muting a first playback mechanism of the first source used to play the non-interactive media content, pausing the first playback mechanism of the first source used to play the non-interactive media content, or playing silence over the first playback mechanism of the first source used to play the non-interactive media content.

38. The method of claim 31, wherein the interactive media content is silenced during at least a period for which the speech recognizer is activated, and the interactive media content is silenced by at least one of:

muting a second playback mechanism of the second source used to play the interactive media content, pausing the second playback mechanism of the second source used to play the interactive media content, or playing silence over the second playback mechanism of the second source used to play the interactive media content.

39. The method of claim 31, wherein the first source and the second source are each at least one of a remote media server, a local file system, and a local memory.

40. The method of claim 31, further comprising:

prior to activating the speech recognizer, cause the interactive media content to be played followed by a prompt, the prompt comprising a message instructing the user to say the action phrase, wherein the second event is associated with an end of the prompt such that the speech recognizer is activated after causing the prompt to be played.

41. A non-transitory computer readable medium comprising one or more computer programs, which when executed by a device with one or more processors, cause the device to:

monitor non-interactive media content in at least an audio or video format that is streamed by a first source to a user;

detect a first event in the non-interactive media content streamed to the user, the first event indicating a start time of a playback of interactive media content and comprising information associated with activating a speech recognizer to detect voice commands spoken by the user;

in response to detecting the first event in the non-interactive media content streamed to the user:

cause the interactive media content in at least an audio or video format to be played by a second source to the user at the indicated start time, and activate the speech recognizer;

while the speech recognizer is activated, receive a voice command spoken by the user and detected by the speech recognizer;

in accordance with a determination that the voice command spoken by the user is an action phrase associated with the interactive media content, cause an action associated with the action phrase to be performed; and
in accordance with a determination that the voice command spoken by the user is not the action phrase associated with the interactive media content, cause the non-interactive media content to continue to be played.

* * * * *